United States Patent
Nakanishi et al.

(10) Patent No.: US 6,965,457 B2
(45) Date of Patent: Nov. 15, 2005

(54) IMAGE PROCESSING APPARATUS, METHOD, AND PROGRAM FOR IMAGE ATTRIBUTE DETERMINATION BASED ON ORTHOGONAL DATA

(75) Inventors: Takashi Nakanishi, Hyogo-ken (JP); Kazuyuki Murata, Kyoto-fu (JP); Hideyuki Kuwano, Osaka-fu (JP); Naoki Takahashi, Kyoto-fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 953 days.

(21) Appl. No.: 09/957,250

(22) Filed: Sep. 21, 2001

(65) Prior Publication Data

US 2002/0033969 A1    Mar. 21, 2002

(30) Foreign Application Priority Data

Sep. 21, 2000   (JP) ............................. 2000-287055

(51) Int. Cl.$^7$ ............................ H04N 1/40; G06T 7/00; G06K 9/34; G06K 9/46
(52) U.S. Cl. ...................... 358/2.1; 358/3.24; 358/462; 382/173; 382/276
(58) Field of Search ........................ 358/1.9, 2.1, 3.24, 358/3.26, 462; 382/173, 176, 276

(56) References Cited

U.S. PATENT DOCUMENTS 5,613,015 A * 3/1997 Suzuki et al. ............... 382/173

FOREIGN PATENT DOCUMENTS

| JP | 64-081080 | 3/1989 | ............ H04N 1/40 |
| JP | 06-223172 | 8/1994 | ............ H04N 1/40 |
| JP | 11-220622 | 8/1999 | ............ H04N 1/40 |
| JP | 2002171406 A * | 6/2002 | ............ H04N 1/40 |

* cited by examiner

*Primary Examiner*—Scott A. Rogers
(74) *Attorney, Agent, or Firm*—McDermott Will & Emery LLP

(57) ABSTRACT

An apparatus for image processing which determines such attributes as screen halftone area, character area and continuous tone area that appear in image data. A wavelet transform circuit wavelet transforms values of picture elements within a reference block selected from an image. Absolute value calculation circuits and adders calculate characteristic values representing characteristics of said reference block for every spatial frequency band on the basis of results of wavelet transform. And a determination circuit determines an attribute of notice area made up of one or a plurality of picture elements within the reference block on the basis of the characteristic values of the reference block.

15 Claims, 25 Drawing Sheets

| a1 | b1 | c1 | d1 |
|----|----|----|----|
| a2 | b2 | c2 | d2 |
| a3 | b3 | c3 | d3 |
| a4 | b4 | c4 | d4 |

(b)

| K1 | L1 | M1 | N1 |
|----|----|----|----|
| K2 | L2 | M2 | N2 |
| K3 | L3 | M3 | N3 |
| K4 | L4 | M4 | N4 |

| 11 | 243 | 248 | 12 |
|----|-----|-----|-----|
| 14 | 246 | 236 | 10 |
| 12 | 241 | 243 | 11 |
| 14 | 238 | 247 | 15 |

(b)

| 2829 | 1153 | −5 | 742 |
|------|------|-----|-----|
| 7 | 3 | −3 | 10 |
| 4 | −8 | 0 | 2 |
| −19 | 17 | −3 | −10 |

| 248 | 245 | 13 | 12 |
|---|---|---|---|
| 249 | 83 | 11 | 10 |
| 12 | 13 | 75 | 247 |
| 14 | 11 | 244 | 249 |

(b)

| 1736 | 14 | 171 | -175 |
|---|---|---|---|
| 6 | 1544 | 167 | 179 |
| 165 | 157 | -163 | 0 |
| -171 | 171 | -4 | -167 |

| 114 | 115 | 117 | 113 |
|-----|-----|-----|-----|
| 121 | 125 | 131 | 129 |
| 134 | 131 | 136 | 134 |
| 138 | 135 | 136 | 139 |

(b)

| 2048 | -22 | 1 | 5 |
|------|-----|---|---|
| -118 | -8 | -11 | 7 |
| -47 | 13 | 3 | 2 |
| -13 | -3 | 0 | 5 |

| 250 | 74 | 238 | 69 |
|---|---|---|---|
| 245 | 82 | 215 | 81 |
| 84 | 210 | 85 | 210 |
| 75 | 231 | 72 | 249 |

(b)

| 2470 | 32 | 57 | 1 |
|---|---|---|---|
| 38 | 64 | 621 | 605 |
| 8 | -14 | 13 | 35 |
| -38 | 14 | 30 | 52 |

| 250 | 210 | 28 | 207 |
|-----|-----|-----|-----|
| 249 | 208 | 24 | 208 |
| 247 | 205 | 21 | 211 |
| 251 | 207 | 18 | 210 |

(b)

| 2754 | 900 | 167 | −745 |
|------|-----|-----|------|
| 14 | 0 | −5 | 19 |
| 6 | 0 | −1 | 5 |
| −2 | −10 | −2 | 2 |

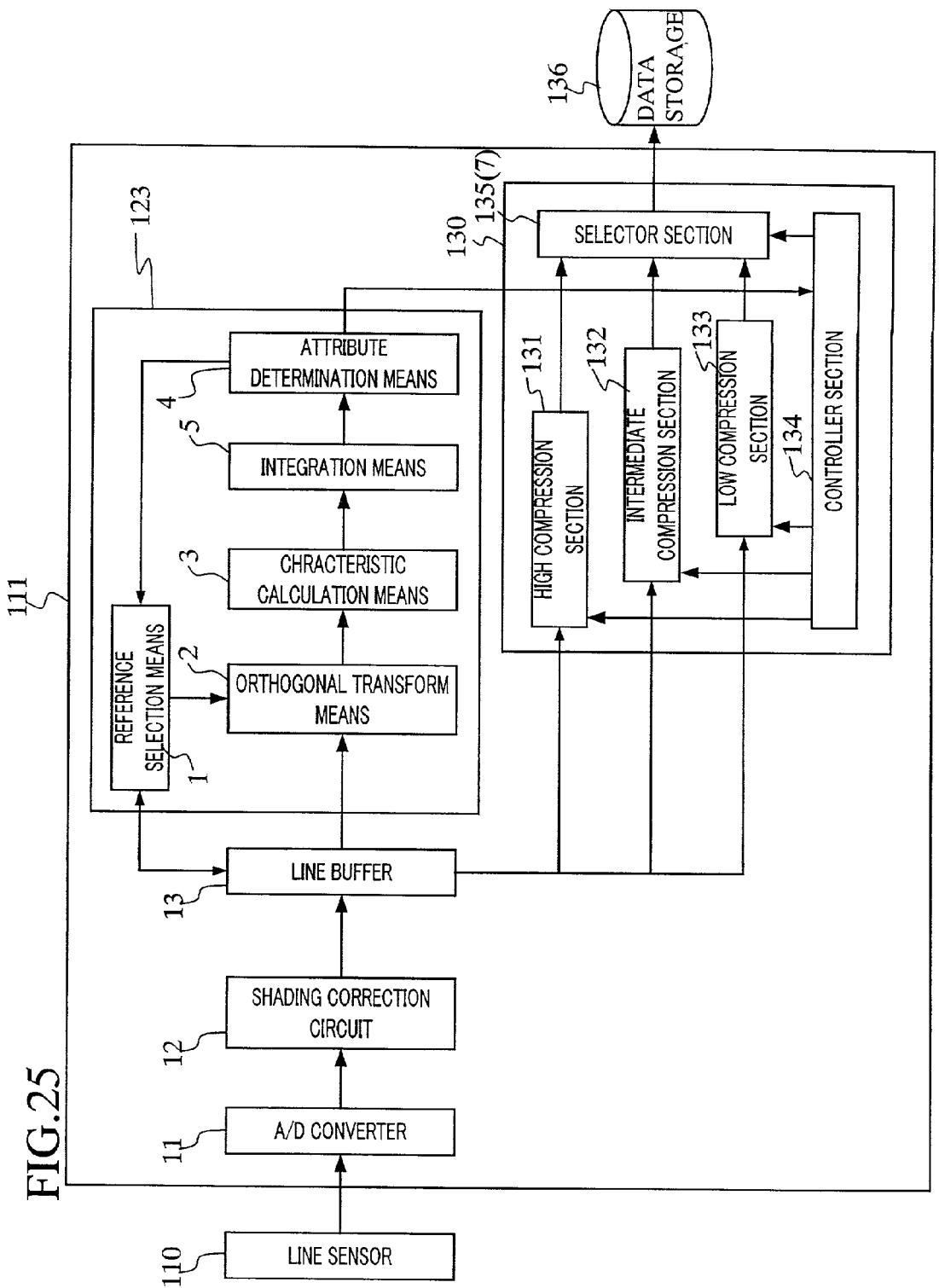

IMAGE PROCESSING APPARATUS, METHOD, AND PROGRAM FOR IMAGE ATTRIBUTE DETERMINATION BASED ON ORTHOGONAL DATA

BACKGROUND OF THE INVENTION

1. Field of the Invention

The present invention relates to an image processing apparatus, image processing method and image processing program for determining such attributes as screen halftone area, character area and continuous tone area that appear in image data.

2. Description of the Related Art

In recent years, the digital copying machine has been spreading, replacing the analog copying machine. The digital copying machine scans an image on a document by charge coupled device (CCD) sensor etc. and converts a signal of the image into digital data. Furthermore, the digital copying machine performs such image processing as filtering, gamma-correction, half-toning etc. for the obtained data of the image and prints the image on paper by laser printer etc.

On the image of the document, there appear various areas such as screen halftone area, character-line drawing area and continuous tone area. Modes of image processing to record on paper an image in high picture quality depend on which area the image or part of the image belongs to. To meet the needs of picture quality, there are some types of the digital copying machines that determine attribute to see which area the image data belong, separate the data according to the attribute and differentiates modes of image processing according to the separated data.

Various separation techniques on the basis of an image data expressed in the space domain have been disclosed. Even in case data expressed in a spatial frequency domain as a result of orthogonal transform such as fast Fourier transform (FFT) and discrete cosine transform (DCT) are handled, the data may be inversely transformed in order to apply the prior art technique. In this case, after separation is carried out on the basis of image data expressed in space domain as the result of inverse transform, orthogonal transform is carried out.

Meanwhile, there are also techniques in which separation is conducted on the basis of data expressed in the spatial frequency domain. Unexamined Japanese patent application No. 6-223172 discloses a technique of separating the character area and non-character area on the basis of data obtained by performing wavelet transform on image data. Also unexamined Japanese patent application No. 11-220622 describes a technique in which an attribute is determined for every object block on the basis of data obtained by performing wavelet transform on image data and each block is separated into character area, screen halftone area or continuous tone area on the basis of the attribute.

However, in case the technique is adopted which does separation on the basis of image data expressed in the space domain, inverse transform and orthogonal transform have to be done for separation, taking extra processing time, when data expressed in the spatial frequency domain is handled.

Also, even in case the technique is adopted of doing separation on the basis of data expressed in the spatial frequency domain, it can happen that the picture quality is insufficient if an image is merely separated into the character area and the non-character area as in a technique described in unexamined Japanese patent application No. 6-223172.

Furthermore, even if an image is separated into the character area, screen halftone area and continuous tone area on the basis of the wavelet transformed data as in the technique described in unexamined Japanese patent application No. 11-220622, since the separation is done block by block, error of determination could have a great adverse effect, decreasing the picture quality.

As set forth above, in such image processing apparatuses like the digital copying machine and scanner, the attributes of image data have to be determined in detail and a mode of image processing suitable for the attribute has to be carried out, but no sufficient attribute determination can be done.

SUMMARY OF THE INVENTION

In view of the problems with the prior art as mentioned above, the present invention having been made, it is an object of the present invention to provide an image processing apparatus, image processing method and image processing program which permit attribute determination with precision.

To achieve the object, the present invention adopts the following means.

In the present invention, reference selection means selects a reference block containing a plurality of picture elements of an image and selects a notice area made up of one or a plurality of picture elements within the reference block. Then, orthogonal transform means obtains orthogonal data that are results of orthogonal transforming values of picture elements within the reference block. Furthermore, characteristic calculation means calculates a characteristic value representing characteristics of the reference block for every spatial frequency band on the basis of the orthogonal data. And attribute determination means determines an attribute of the notice area on the basis of the characteristic value.

The attribute to be determined includes the screen halftone area, character area or continuous tone area. Since that attribute is determined for every notice area, precise attribute determination will be possible.

In addition, there may be provided integration means for integrating the characteristic values of the reference block and characteristic values of other blocks for every spatial frequency. In this case, attribute determination means determines the attribute of the notice area on the basis of the integration results by integration means. The accuracy of attribute determination can be improved so much as the characteristic values are integrated. In order to perform the determination, even if determination results of other blocks are utilized for the determination, the effect of error of determination tends to propagate. Meanwhile, if the characteristic values of other blocks are integrated and attribute determination is performed on the notice area alone, the effect of error of determination can be reduced.

Also, there may be provided correction calculation means for calculating a correction value base on the orthogonal data of a specific spatial frequency band. In this case, attribute determination means determines the attribute of the notice area on the basis of the characteristic value and the correction value. By using the correction value in attribute determination, error of determination can be reduced when the characteristic values resemble.

Furthermore, integration means may be so arranged as to integrate not only the characteristic values but also the correction values. Also, characteristic calculation means preferably calculates the characteristic values on the basis of the orthogonal data other than the orthogonal data with the lowest spatial frequency band.

The image to be object for attribute determination is an image scanned from a document. In this case, reference selection means selects reference block one after another with moving a position of selecting the reference block by one picture element in a main-scanning direction of the document. And the moving of the position in the main-scanning direction is continued by the reference selection means after moving the position in the sub-scanning direction of the document if the last position is an end in the main-scanning direction.

In case picture elements of an image are contained only in a part of the reference block, the values of the picture elements of the reference block other than the part are stuffed with values representing a white image.

Furthermore, in case a notice area in other block is outside the image, integration means integrates the characteristic values of the reference block and the characteristic values of other block whose notice area is inside the image without the characteristic values of other block whose notice area is outside the image. The other block is a block with its notice area around the notice area of the reference block, for example.

Furthermore, determination results are used for selection of the mode of image processing. The modes of image processing include simple binarization and error diffusion processing, dither processing and compressing.

BRIEF DESCRIPTION OF THE DRAWINGS

FIG. 4 is a diagram showing the relation between image data and orthogonal data.

FIG. 7 is a diagram showing a concrete example of image data and orthogonal data in case the document is paper with characters printed thereon.

FIG. 8 is a diagram showing a concrete example of image data and orthogonal data in case the document is screen-printed paper.

FIG. 9 is a diagram showing a concrete example of image data and orthogonal data in case the document is photographic paper with a photo printed thereon.

FIG. 20 is a diagram showing a concrete example of image data and orthogonal data of a screen halftone area with a low resolution.

FIG. 21 is a diagram showing a concrete example of image data and orthogonal data related to a character (line) area with a high resolution.

FIG. 25 is a block diagram showing the outline arrangement of a signal processing section in case the present invention is applied to a scanner.

DESCRIPTION OF THE PREFERRED EMBODIMENTS

Embodiment 1

The present invention is applied to the digital copying machine, for example. The overall construction of this digital copying machine is shown in FIG. 2.

Figure 2:
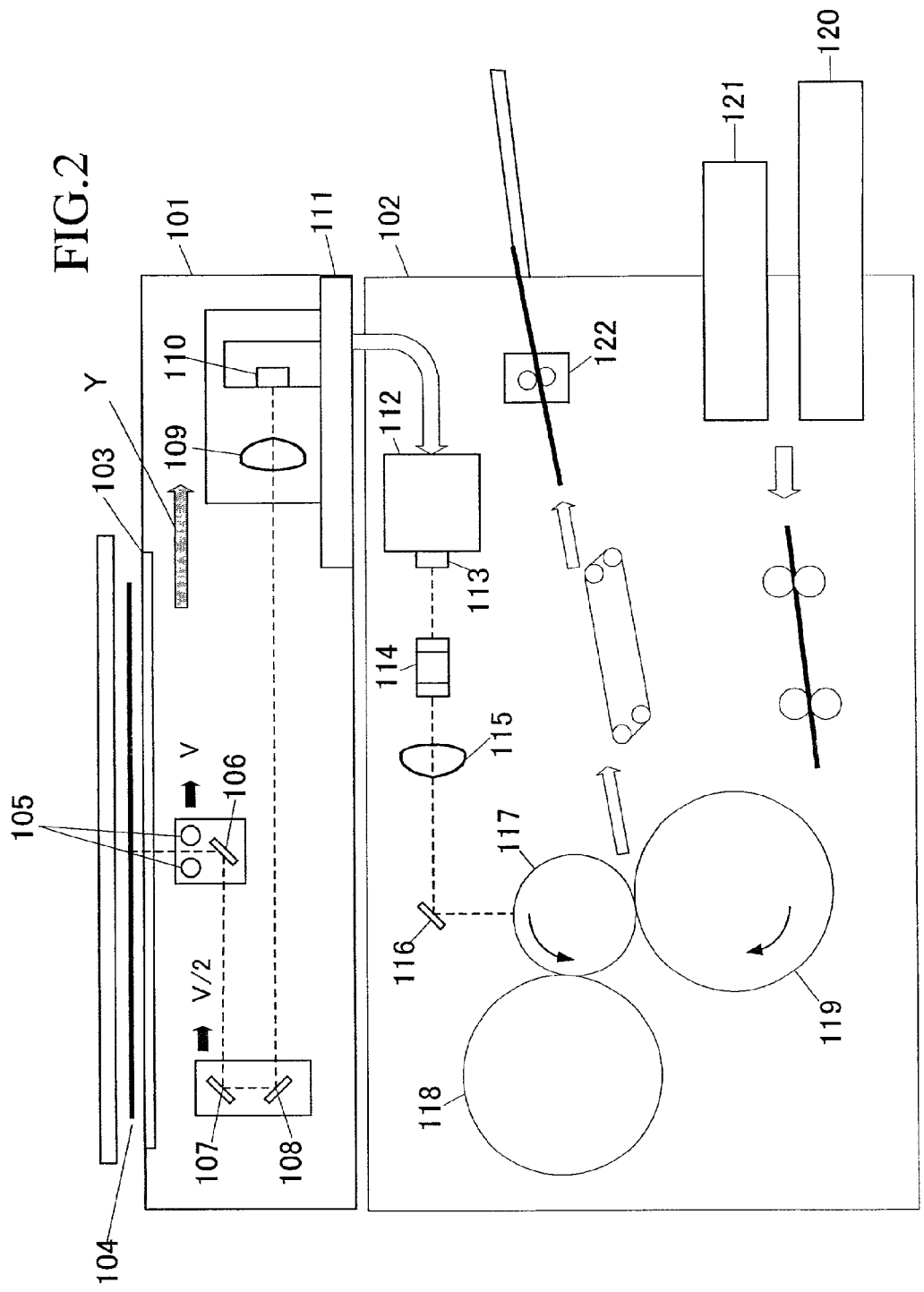
FIG. 2 is a diagram showing the whole arrangement of a digital copying machine to which the present invention is applied.

As shown in FIG. 2, this digital copying machine is equipped with an image scanner section 101 for scanning an image on a document 104. There is provided a document tray glass 103 (hereinafter platen) on the upper surface of a housing of the image scanner section 101. The document 104 is put on the platen 103. A lamp 105 sheds light on the document 104 through the platen 103. Scanning mirrors 106, 107, 108 lead to an image-formation lens 109 a reflected light from the exposed document 104. The image-formation lens 109 forms an image on a line sensor 110 with the reflected light from the document 104. The lamp 105 and the scanning mirrors 106, 107, 108 move at uniform scanning speeds in sub-scanning direction Y. The scanning speed of the scanning mirrors 107, 108 is half the scanning speed V of the lamp 105 and the scanning mirror 106, and scanning does not change the optical path. The line sensor 110 is made up of CCD, for example, and converts the reflected light into analog electric signal. Since the electrical scanning direction of the line sensor 110 is parallel with the main-scanning direction X perpendicular to the sub-scanning direction Y, an electric signal can be obtained over the whole surface of document 104 as the lamp 105 and the scanning mirrors 106, 107, 108 move. This analog signal is outputted from the line sensor 110 to the signal processing section 111. The signal processing section 111 converts analog data into a digital signal, performs image processing on the data of the image obtained and outputs the data to a printer section 102.

The printer section 102 records on paper the data of the image inputted from an image scanner section 101. The data of the image is sent to a laser driver 112. The laser driver 112 modulation drives semiconductor laser 113 according to the data of the image. A polygon mirror 114 and an f? lens 115 scan a photosensitive drum 117 with laser beam from the semiconductor laser 113 through mirror 116. That forms an electrostatic latent image on the photosensitive drum 117. A developer 118 is provided around the circumferential surface of the photosensitive drum 117. The developer 118 has toner (development material) stick to the electrostatic latent image and develops the electrostatic latent image. A transfer drum 119 transfers the developed image (toner image) on paper fed from printing paper cassettes 120, 121. The paper with the toner image transferred thereon is sent from the transfer drum 119 to a fixing unit 122. The fixing unit 122 fixes the toner image on the paper. After fixing, the paper is sent outside.

Images thus recorded on the paper vary in quality depending on the mode of image processing at the signal processing section 111. The construction of the signal processing section 111 is shown in FIG. 1 in more detail.

Figure 1:
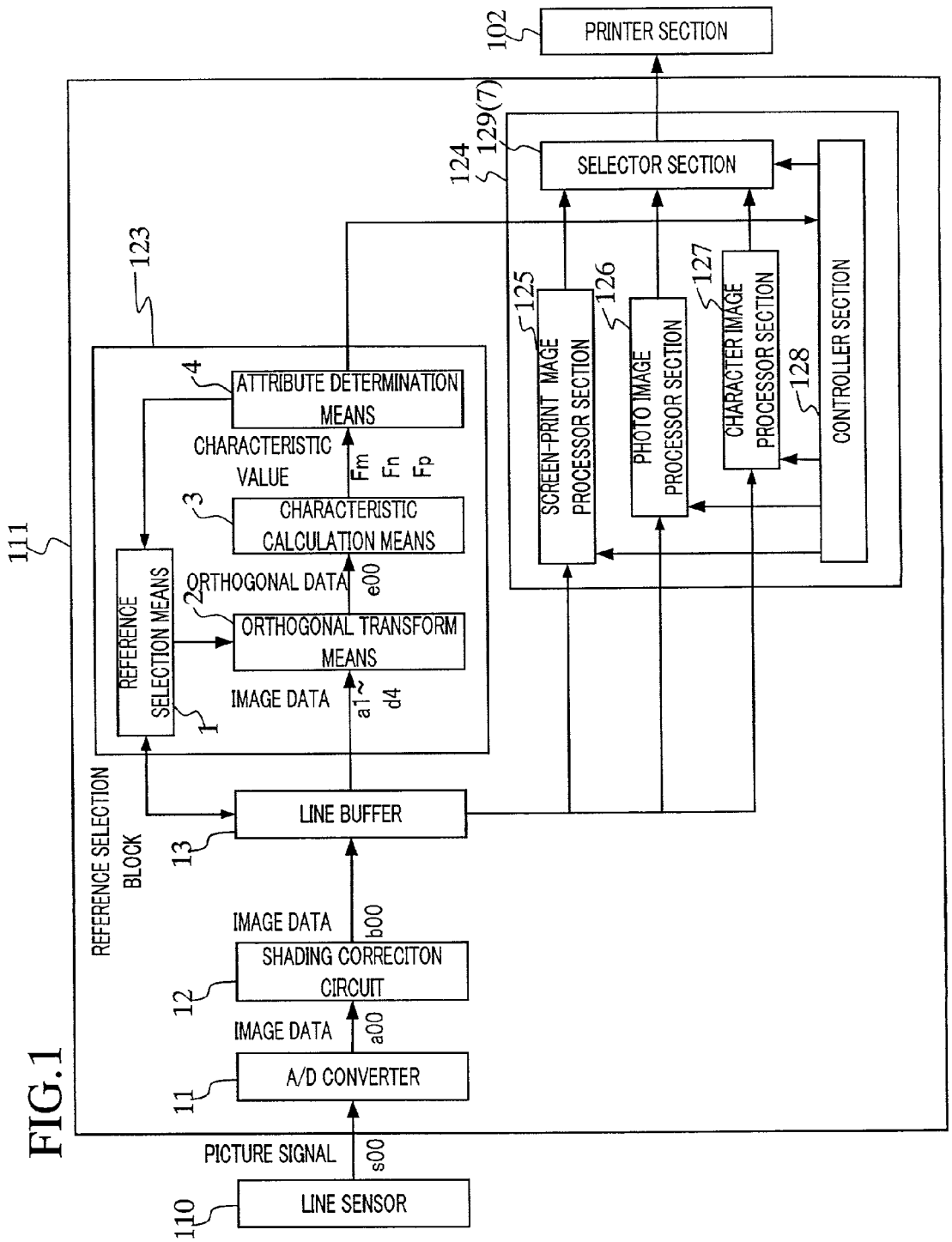
FIG. 1 is a block diagram showing the outline arrangement of a signal processing section provided in a digital copying machine in Embodiment 1.

As shown in FIG. 1, the signal processing section 111 is equipped with an A/D converter 11. The A/D converter 11 converts into digital image data a00 an analog electric signal (picture signal s00) inputted from the line sensor 110. The analog electric signal corresponds to the luminance of the reflected light that goes into the respective picture elements of the line sensor 110, while the A/D converter 11 converts the luminance of the respective picture elements into digital data of 8 bits, for example. A shading correction circuit 12 corrects image data a00 from the A/D converter 11 on the basis of the sensitivity unevenness of the line sensor 110 and the lighting unevenness of the lamp 105. A line buffer 13 memorizes the image data b00 in lines corresponding to the main-scanning direction X, the image data b00 corrected in the shading correction circuit 12.

Figure 3:
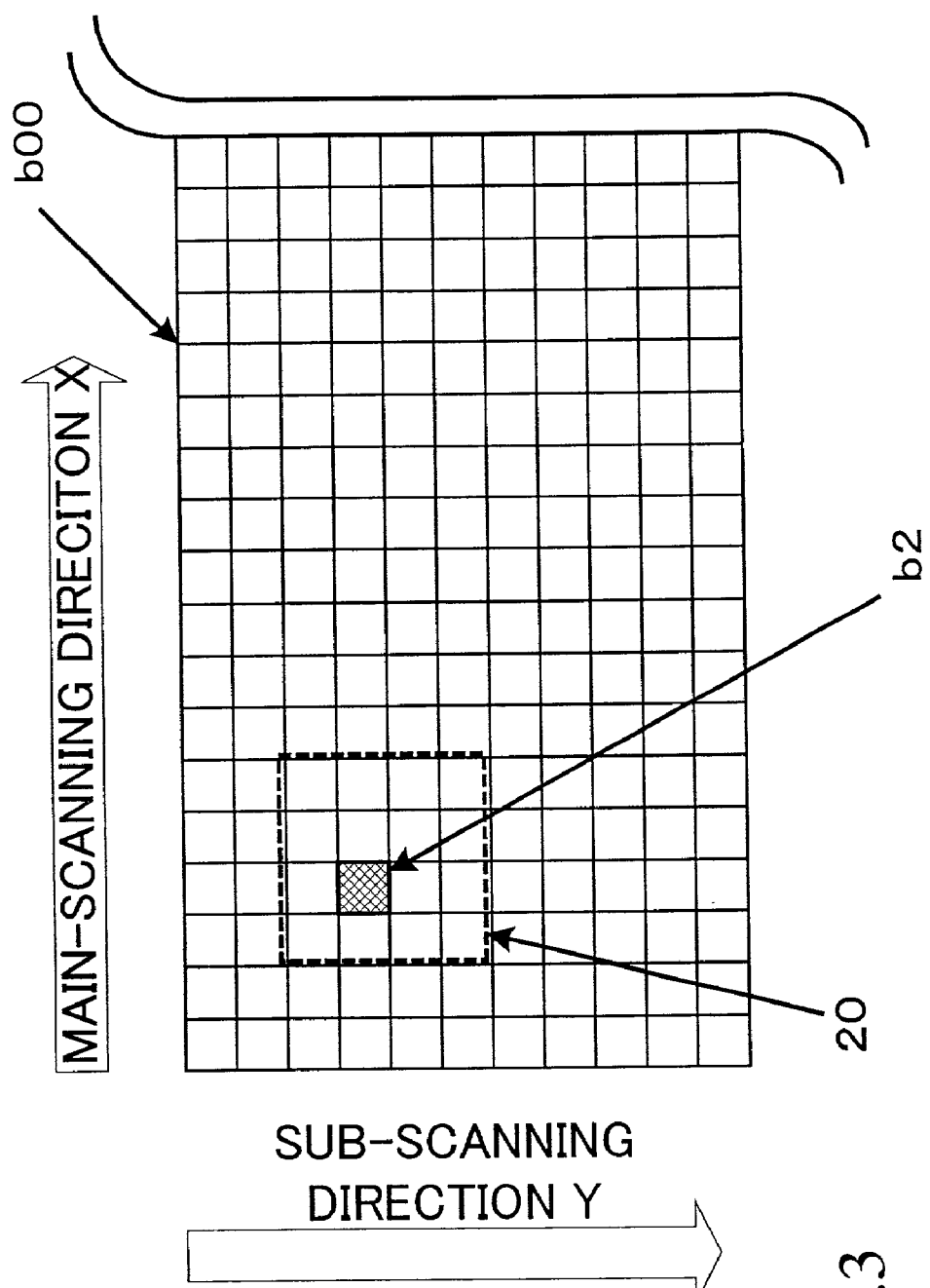
FIG. 3 is a diagram showing the makeup of a reference block and selection of a reference block.

For example, in case a document paper of JIS size A4 is scanned at 600 dpi, as shown in FIG. 3, the line buffer 13 memorizes data for 10 picture elements in the sub-scanning direction Y and data for some 4,900 picture elements in the main-scanning direction X. In the buffer area for each picture element, data b00 of 8 bits that represents luminance is stored.

An attribute determination section 123 performs attribute determination on image data b00 stored in the line buffer 13. The reference selection means 1 in the attribute determination section 123 selects reference block 2R containing a plurality of picture elements of an image and a notice area made up of one or a plurality of picture elements within the reference block 2R. Here, the picture elements of an image are picture elements of which data are stored in the line buffer 13. The reference block 2R is made up of 4×4=16 picture elements as shown in FIG. 3 and FIG. 4(*a*), for example. As a notice area, notice picture element b2 within the reference block, for example, is selected. This notice picture element b2 is a picture element at a specific position within the reference block 2R. The reference selection means 1 notifies orthogonal transform means 2 of the selected reference block 2R and notice picture element b2.

The orthogonal transform means 2 reads out from line buffer 13 the data of the respective picture elements within that indicated reference block 2R and performs orthogonal transform in blocks. The orthogonal data obtained as the results of orthogonal transform indicates the coefficient of each component in the spatial frequency domain. When data a1–d4 of the respective picture elements within the reference block 2R made up of 4×4=16 picture elements are given as shown in FIG. 4(*a*), the same number of orthogonal data K1 to N4 as the number of picture elements is obtained. It is noted that in case image data are given in 8 bits, the attribute determination will not be influenced even if the two subordinate 2 bits of the image data are cut off or shifted.

For orthogonal transform, orthogonal wavelet transform can be used. In this case, if the object for transform is given in 1×4 data string (A, B, C, D), operation is so made that the result of addition of two neighboring elements is relocated in the first half and the subtraction result is relocated in the latter half. Through this operation, a data string (A+B, C+D, A−B, C−D) can be obtained. Further, the elements in the first half of this data string alone are subjected to the above operation. Through that, a data string ((A+B)+(C+D), (A+B)−(C+D), A−B, C−D) can be obtained. The orthogonal data (K, L, M, N) obtained by the wavelet transform can be expressed by that data string. That is, K=(A+B)+(C+D), and L=(A+B)−(C+D), and M=A−B and N=C−D.

In case a data string is expressed in an arrangement of two or more columns, the same operation is performed both in the horizontal direction (row direction) and the vertical direction (column direction). For example, after operation is carried out in the row direction, operation is performed in the column direction on the basis of the results. Operation may be done in either of the directions first. The final results are the same.

In case the above-mentioned operation is performed on image data a1 to d4 shown in FIG. 4(*a*), orthogonal data K1 to N4 obtained by the wavelet transform are given in the following transform equations:

$K1=(a1+a2+a3+a4+b1+b2+b3+b4)+$
$\quad(c1+c2+c3+c4+d1+d2+d3+d4)$ $K2=(a1+a2+a3+a4+b1+b2+b3+b4)-$
$\quad(c1+c2+c3+c4+d1+d2+d3+d4)$ $K3=(a1+b1+c1+d1)-(a2+b2+c2+d2)$ $K4=(a3+b3+c3+d3)-(a2+b4+c4+d4)$ (First column)

$L1=(((a1+b1)-(c1+d1))+((a2+b2)-(c2+d2)))+$
$\quad(((a3+b3)-(c3+d3))+((a4+b4)-(c4+d4)))$ $L2=(((a1+b1)-(c1+d1))+((a2+b2)-(c2+d2)))-$
$\quad(((a3+b3)-(c3+d3))+((a4+b4)-(c4+d4)))$ $L3=((a1+b1)-(c1+d1))-((a2+b2)-(c2+d2))$ $L4=((a3+b3)-(c3+d3))-((a4+b4)-(c4+d4))$ (Second column)

$M1=((a1-b1)+(a2-b2))+((a3-b3)+(a4-b4))$ $M2=((a1-b1)+(a2-b2))-((a3-b3)+(a4-b4))$ $M3=(a1-b1)-(a2-b2)$ $M4=(a3-b3)-(a4-4b)$ (Third column)

$N1=((c1-d1)+(c2-d2))+((c3-d3)+(c4-d4))$ $N2=((c1-d1)+(c2-d2))-((c3-d3)+(c4-d4))$ $N3=(c1-d1)-(c2-d2)$ $N4=(c3-d3)-(c4-d4)$ (Fourth column)

Figure 5:
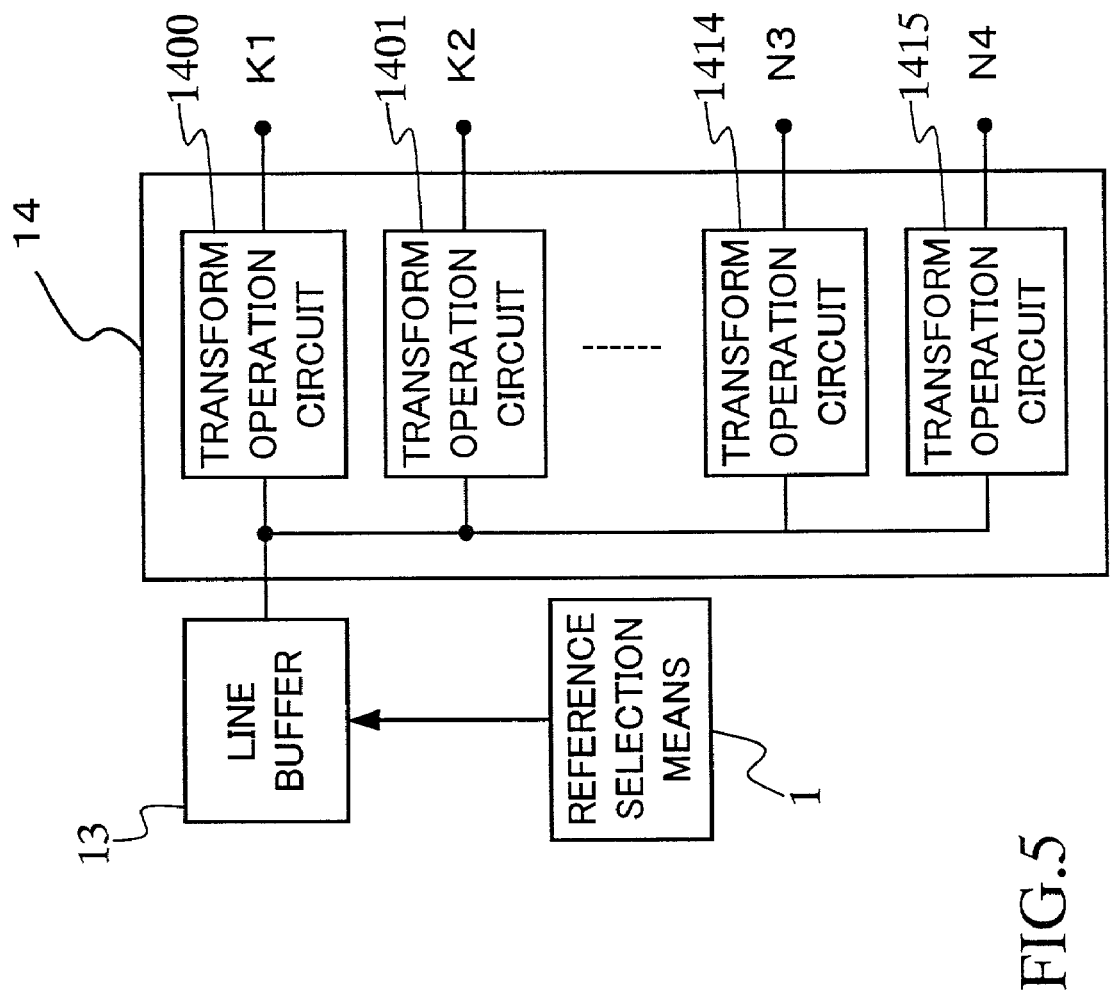
FIG. 5 is a diagram showing the configuration of a wavelet transform circuit.

In this case, orthogonal transform means 2 can be materialized by a wavelet transform circuit 14 as shown in FIG. 5. As shown in FIG. 5, the wavelet transform circuit 14 is made up of transform operation circuits 1400, 1401 to 1414, 1415 that correspond to the respective transform equations. The respective transform operation circuits 1400 to 1415 are made up of adder-subtracters only as is evident from the respective transform equations, and therefore it is possible to attain a high-speed operation.

It is noted that instead of such wavelet transform, other orthogonal transforms such as FFT and DCT may be utilized for orthogonal transform.

The orthogonal data e00 as mentioned above is outputted to a characteristic calculation means 3.

The characteristic calculation means 3 calculates characteristic values representing characteristics of the reference block 2R for spatial frequency bands, that is, the low spatial frequency band, intermediate spatial frequency band and high spatial frequency band, on the basis of orthogonal data e00 from orthogonal transform means 2.

Figure 6:
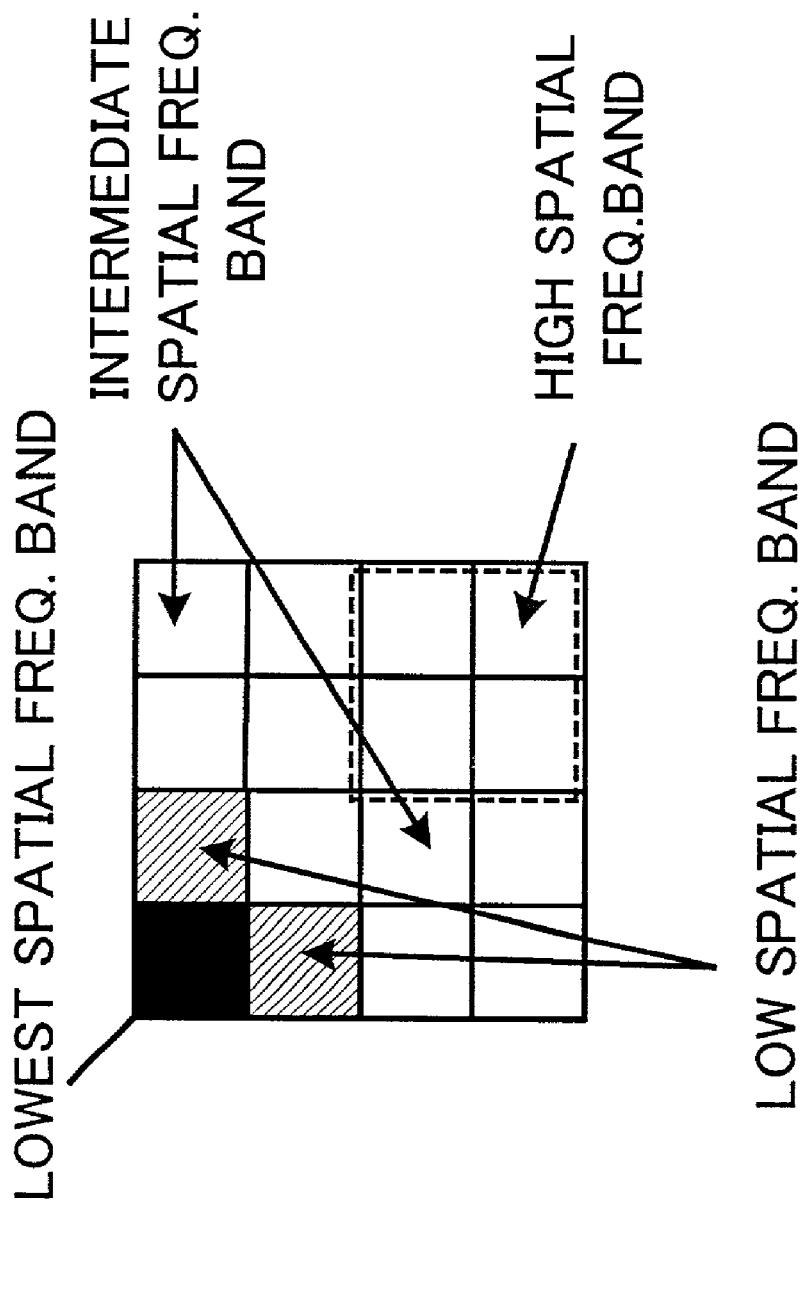
FIG. 6 is a diagram showing classification of a reference block into spatial frequency bands.

Orthogonal data K1 to N4 shown in FIG. 4(b) which corresponds to the reference block made up of 4×4=16 picture elements are classified into the respective spatial frequency bands as shown in FIG. 6, for example. Orthogonal data K1 is classified as the lowest spatial frequency band. Orthogonal data L1, K2 are also classified as the low spatial frequency band. Orthogonal data K3, L2, M1, N1, M2, L3, K4, L4, N2 are classified as the intermediate spatial frequency band. Orthogonal data M3, N3, M4, N4 are classified as the high spatial frequency band. Of them, orthogonal data K1 classified as the lowest spatial frequency band indicates a direct current component (constant term), while orthogonal data L1 to N4 classified as other spatial frequency bands indicate alternating current components. Because the characteristics of the reference block appear in the alternating current components, orthogonal data K1 classified as the lowest spatial frequency band is not used here.

Meanwhile, in the reference block belonging to the character area expressed in line such as characters, the orthogonal data classified as low spatial frequency band tends to large in absolute value. FIG. 7(a) shows a concrete example of image data in case the document is paper on which characters are printed. As shown in FIG. 7(a), the values of the picture elements in the two columns inside are substantially large as compared with the values of the picture elements in the other two columns, whereby vertical line is expressed. FIG. 7(b) shows a concrete example of orthogonal data in this case. As shown in FIG. 7(b), if orthogonal data classified as low spatial frequency band are excluded, the absolute values of the orthogonal data classified as low spatial frequency band are substantially larger than the absolute values of the orthogonal data classified as other bands.

In the reference block belonging to the screen halftone area with a low resolution, the absolute values of the orthogonal data classified as intermediate spatial frequency band are large, and in the reference block belonging to a screen halftone area with a high resolution, the absolute values of the orthogonal data classified as high spatial frequency band are large. FIG. 8(a) shows a concrete example of image data when the document is screen-printed paper. FIG. 8(b) shows a concrete example of the orthogonal data in that case. In this example as shown in FIG. 8(b), the absolute values of the orthogonal data classified as intermediate spatial frequency band are substantially large.

Furthermore, in the reference blocks belonging to the continuous tone area, the absolute values of the orthogonal data classified as specific band less tend to be large. FIG. 9(a) shows a concrete example of image data when the document is photographic paper on which a photo image is printed. FIG. 9(b) shows a concrete example of orthogonal data in that case. As shown in FIG. 9(b), no orthogonal data of values exceeding 1000 is present unlike in the other cases. In this case, the largest difference among absolute values of orthogonal data is some 100.

Therefore, the characteristic value Fm in the low spatial frequency band, the characteristic value Fn in the intermediate spatial frequency band, the characteristic value Fp in the high spatial frequency band are given on the basis of orthogonal data L1 to N4 shown in FIG. 4(b) as follows:

$$Fm=|L1|+|K2|+|L2|$$

$$Fn=|M1|+|N1|+|M2|+|N2|+|K3|+|L3|+|K4|+|L4|$$

$$Fp=|M3|+|N3|+|M4|+|N4|$$

(Note: |**| indicates an absolute value.)

Figure 10:
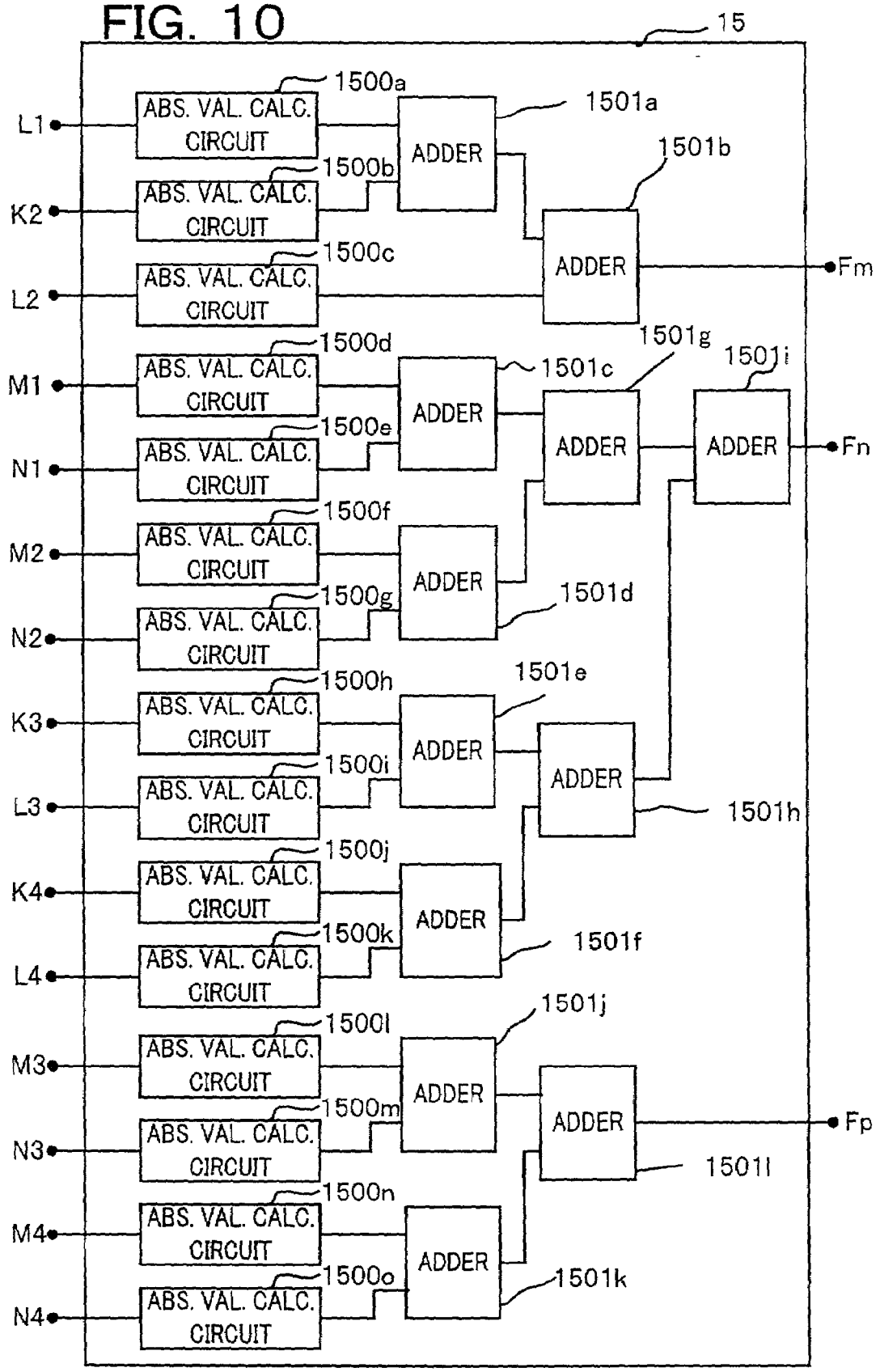
FIG. 10 is a diagram showing the configuration of an operation circuit.

In this case, characteristic calculation means 3 can be materialized by a calculation circuit 15 as shown in FIG. 10. The calculation circuit 15 has absolute value calculation circuits 1500a, 1500b to 1500n, 1500o as shown in FIG. 10. To absolute value calculation circuits 1500a to 1500o, orthogonal data L1 to N4 are inputted respectively. Absolute value calculation circuits 1500a to 1500o calculate the absolute values of the respective orthogonal data and output the results to adders 1501a, 1501c, 1501d, 1501e, 1501f, 1501j, 1501k. The respective absolute value calculation circuits 1500a, 1600b to which orthogonal data L1, K2 are inputted, for example, outputs absolute values |L1|, |K2| to adder 1501a.

Adders 1501a–1501l are disposed according to the above equations. The adder 1501a adds |L1| from the absolute value calculation circuit 1500a and |K2| from absolute value calculation circuit 1500b and outputs |L1|+|K2| to the adder 1501b. To the adder 1501b, |L1|+|K2| from the adder 1501a and |L2| from the absolute value calculation circuit 1500c are inputted. The adder 1501b adds these, obtains |L1|+|K2|+|L2| and outputs the result as characteristic value Fm of the low spatial frequency band. Similarly, the adder 1501i outputs the characteristic value Fn of the intermediate spatial frequency band and the adder 1501l outputs the characteristic value Fp of the low spatial frequency band.

The respective characteristic values are calculated on the basis of the respective orthogonal data shown in FIG. 7(b), FIG. 8(b) and FIG. 9(b). In the example of FIG. 7(b), Fm=1564, Fn=1356, Fp=334. In the example of FIG. 8(b), Fm=1163, Fn=808, Fp=15. In the example of FIG. 9(b), Fm=148, Fn=100, Fp=10.

Those characteristic values Fm, Fn, Fp are outputted to the attribute determination means 4.

Figure 11:
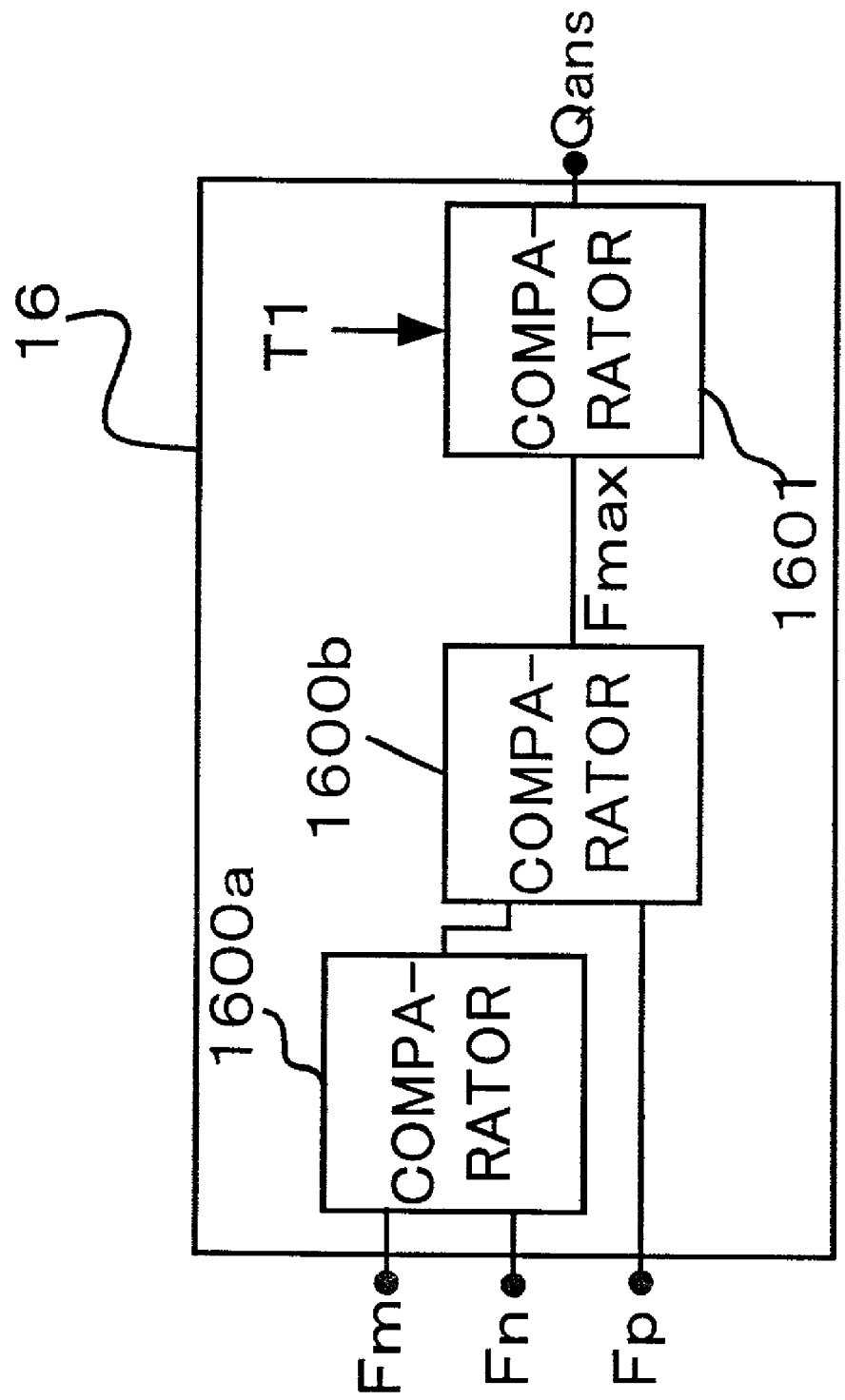
FIG. 11 is a diagram showing the configuration of a determination circuit in Embodiment 1.

The attribute determination means 4 determines an attribute of the notice picture element b2 on the basis of the respective characteristic values. The attribute determination means 4 can be materialized by a determination circuit 16 as shown in FIG. 11, for example. As shown in FIG. 11, the determination circuit 16 is provided with comparators 1600a, 1600b, 1601. The comparator 1600a compares characteristic value Fm and characteristic value Fn to see which is larger and outputs the larger value. The comparator 1600b compares the output of the comparator 1600a and characteristic value Fp to see which is larger and outputs the larger value. The comparator 1601 compares the output Fmax of the comparator 1600b and threshold value T1 to see which is larger.

The threshold value T1 is set in advance according to the number of bits indicating image data of one picture element and the number of picture elements in the reference block. In case image data in one picture element are expressed in 8 bits and the number of picture elements in the reference block is 4×4=16, the threshold value is set at about "500."

In case Fmax<T1, specific data indicating a continuous tone area is outputted as determination result Qans of notice picture element b2. In case a 2-bit logical signal is used to express determination result Qans, determination result Qans is expressed in "00" to indicate the continuous tone area, for example. Unless Fmax<T1, determination result Qans is outputted depending on which Fmax is, Fm, Fn or Fp. If Fmax is characteristic value Fm, specific data to indicate a character area, "11", for example, is outputted as determination result Qans of notice picture element b2. In case Fmax is characteristic value Fn or Fp, specific data to indicate that the attribute is the screen halftone area, "10," for example, is outputted as determination result Qans of notice picture element b2.

If the attribute of notice picture element b2 within the reference block 2R is determined like that way, the attribute determination means 4 informs the reference selection means 1 to that effect. So informed, the reference selection means 1 selects the next reference block 2R and notice picture element b2. Then, the position of the reference block 2R selected by the reference selection means 1 is decided on this way. The position of the reference block 2R to be selected is moved from the last position of the reference block 2R by a specific number of picture elements at least in one way in the main-scanning direction X and sub-scanning direction Y.

For example, the position of the reference block 2R is moved by one picture element in the main-scanning direction X every time the reference block 2R is selected and the moving in the main-scanning direction X is over, then the position is moved by one picture element in the sub-scanning direction Y, then the selection of the reference block 2R with the moving in the main-scanning direction X is started again. The position of notice picture element b2 in relation to reference block 2R does not change. If the attribute determination is repeated each time selection is done, attribute determination of all data b00 stored in the line buffer 13 can be carried out.

The example of reference block 2R with 4×4=16 picture elements has been described. In this case, information obtained from image data corresponding to this reference block 2R is insufficient. The larger the number of picture elements of reference block 2R, the higher the accuracy of attribute determination. In case wavelet transform is used, the number of picture elements in the main-scanning direction X or the sub-scanning direction Y of reference block 2R has to take a value of powers of 2. In practice, therefore, it is desirable that reference block 2R containing more than 8×8=64 should be used.

To increase the number of picture elements in sub-scanning direction Y of reference block 2R, however, that number of lines of the line buffer 13 has to be secured. In consideration of cost, the number of picture elements in the sub-scanning direction Y is preferably about 4. Meanwhile, even if the number of picture elements in the main-scanning direction X is set high, the number of lines of the line buffer 13 does not have to be increased. For this reason, a reference block containing 4×16=64 picture elements may be used instead of a reference block containing 8×8=64 picture elements.

It is also noted that depending on the position of a reference block 2R selected by the reference selection means 1, it can happen that picture elements of an image is included only in a part of the reference block 2R.

Figure 12:
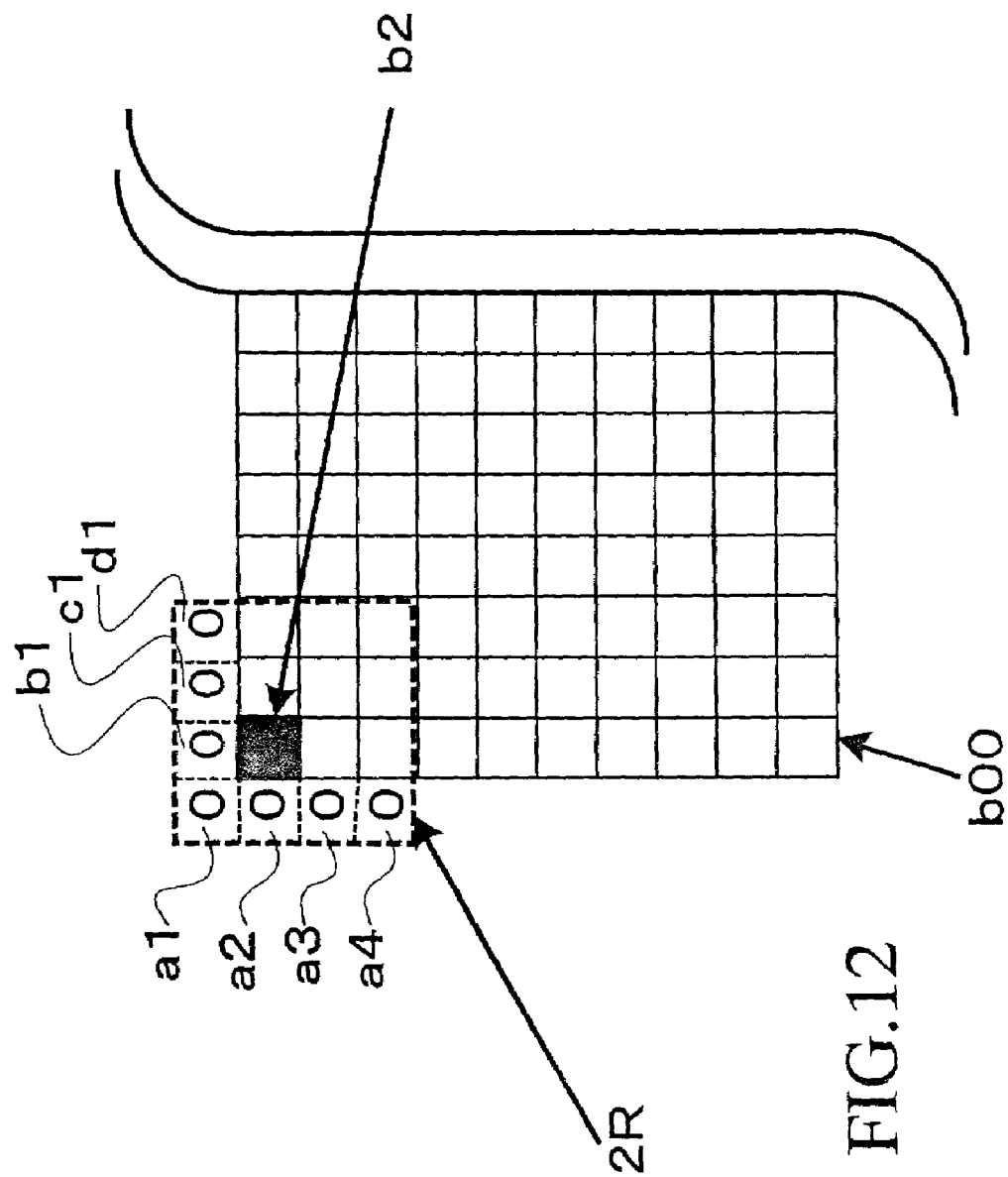
FIG. 12 is a diagram showing a selected reference block containing picture elements of which data are not stored.

In case the picture element at the position which is a corner of image data b00 stored on the line buffer 13 is selected as notice picture element b2 as shown in FIG. 12, for example, data of picture elements a1, b1, c1, d1, a2, a3, a4 within the reference block are not stored on the line buffer 13.

In that case, values of the picture elements a1, b1, c1, d1, a2, a3, a4, which are the picture elements within the reference block 2R other than the picture elements whose data b00 are stored on the line buffer 13, are stuffed with values representing white images. In case, for example, image data are expressed in 8 bits, symbols "0", "1", . . . , "254", "255" can be applied to the respective tone levels from white to black. In this case, data "0" is a value representing a white image. Contrary to this example, in case symbols "0", "1", . . . , "254", "255" are applied to the respective tone levels from black to white, the value which represents a white image is "255."

Values of the picture elements are stuffed with values representing white images like that. That is why white color of the ground of the document usually comes out on the edge of the image on the document, and moreover, white images have no effect on attribute determination.

That permits attribute determination of each picture element even if no picture element data are found partially within the reference block Determination results by the attribute determination means 4 are outputted from the attribute determination section 123 to the image processor section 124.

The image processor section 124 is provided with a screen-print image processor section 125, a photo image processor section 126 and a character image processor section 127 that performs image processing for screen halftone area, continuous tone area and character area respectively.

As controlled by controller section 128, the following sections, that is, the screen-print image processor section 125, photo image processor section 126 and character image processor section 127 read out image data b00 stored on the line buffer 13 respectively. On the image data b00 that is read out, character image processor section 127 performs simple binarization. And the photo image processor section 126 and the screen-print image processor section 125 do error diffusion and dither processing. Through this processing, a continuous tone is expressed in a pseudo manner. In addition, to improve the quality of reproduced image, the screen-print image processor section 125 does moire-eliminating processing, and the character image processor section 127 performs sharpening processing as necessary.

The respective outputs of the screen-print image processor section 125, photo image processor section 126 and character image processor section 127 are inputted into selector section 129. The selector section 129 is a concrete example of image processing selection means 7. The controller section 128 makes the selector section 129 select one of the inputs in accordance with the determination results from the attribute determination section 123. If, for example, the determination result is "00", the selector section 129 outputs to the printer section 102 the input from the photo image processor section 126. If the determination result is "11", the selector section 129 outputs to the printer section 102 the input from the character image processor section 127. If the determination result is "10", the selector section 129 outputs to the printer section 102 the input from the screen-print image processor section 125.

Thus, image processing is conducted according to the determination result of each picture element, and therefore it is possible to record on paper an image in high picture quality.

Embodiment 2

Figure 13:
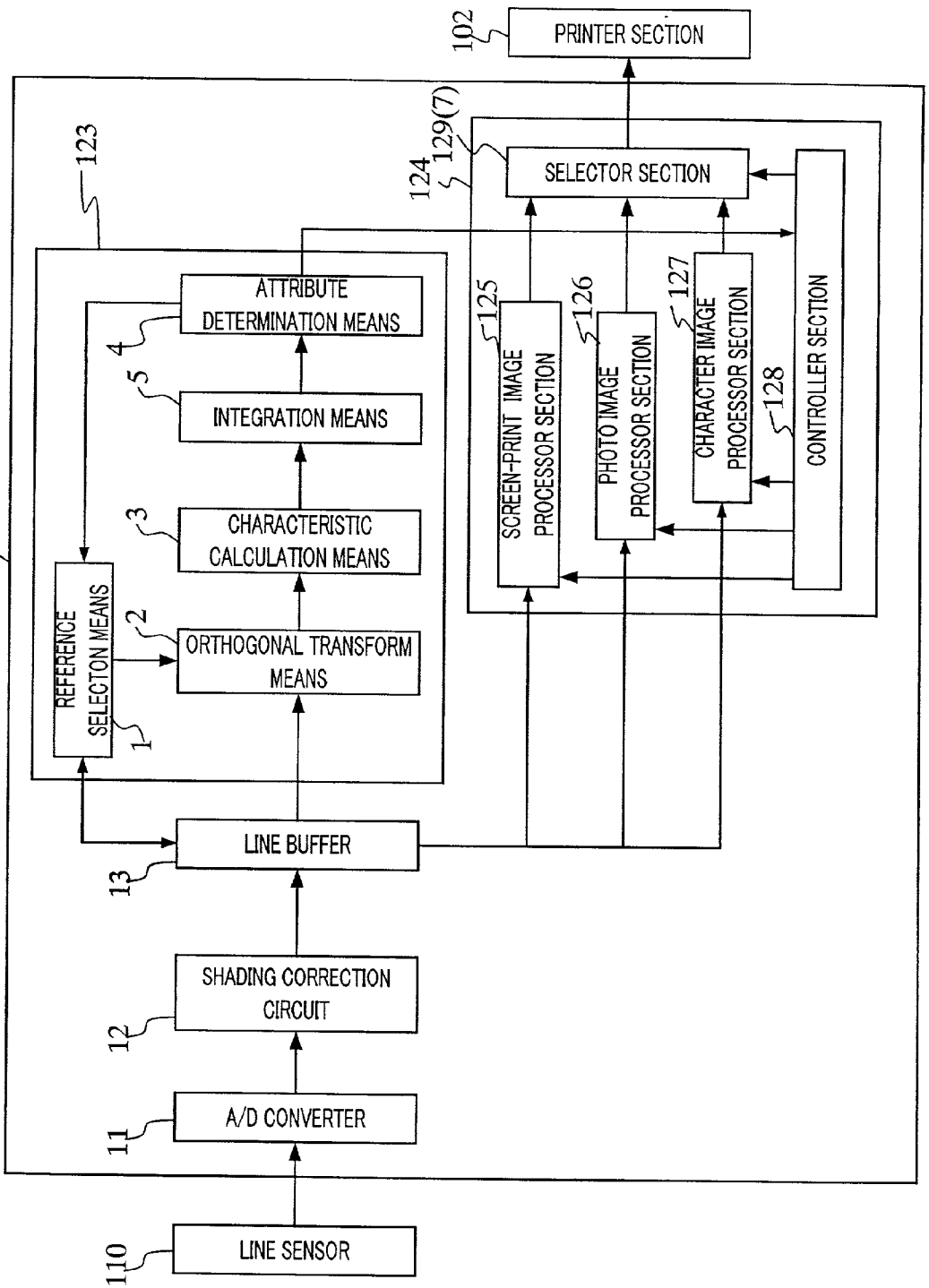
FIG. 13 is a block diagram showing the outline arrangement of a signal processing section provided in a digital copying machine in Embodiment 2.

FIG. 13 shows the outline of the makeup of the signal processing section 111 in Embodiment 2.

Figure 14:
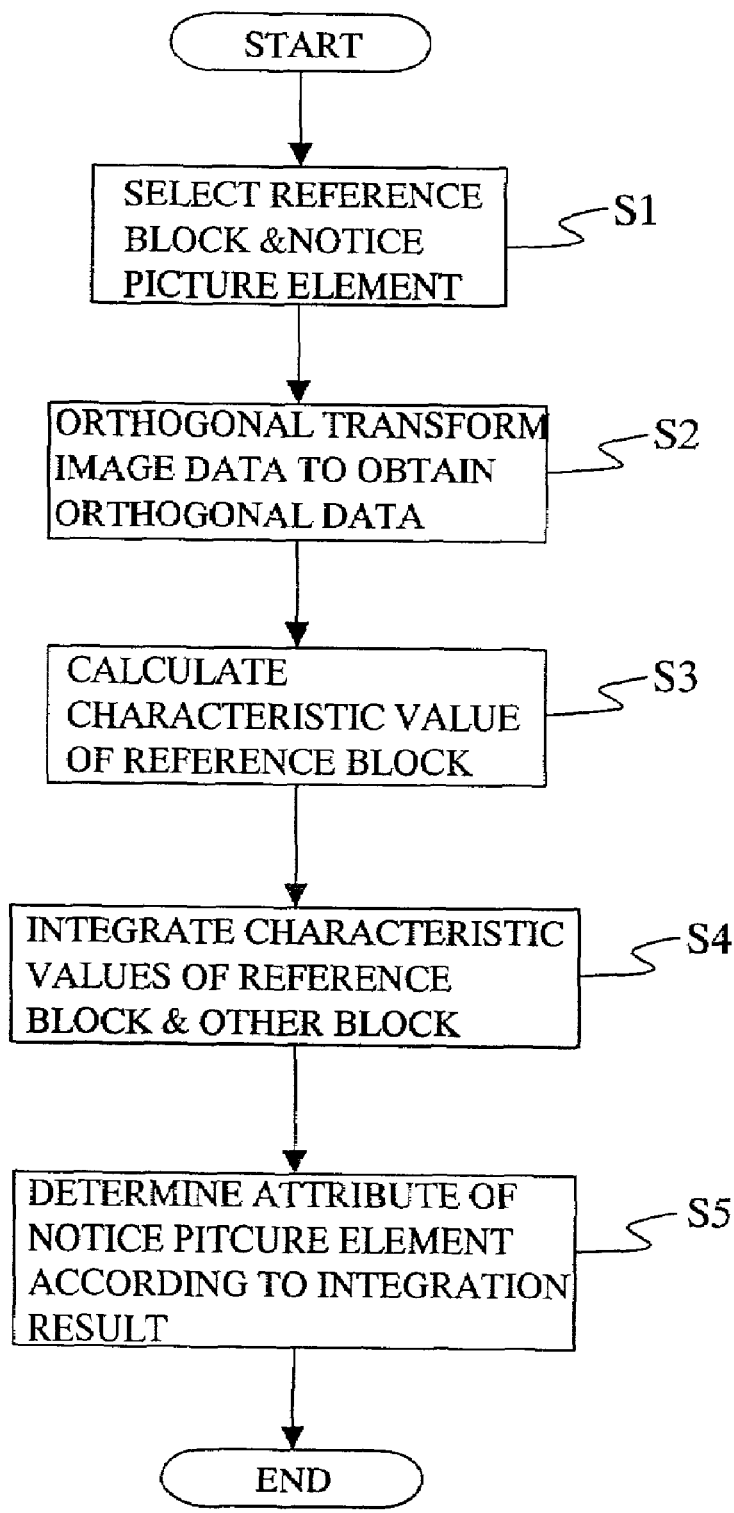
FIG. 14 is a flow chart explaining the steps of the image processing in Embodiment 2.

As shown in FIG. 13, this signal processing section 111 has integration means 5 between the characteristic calculation means 3 and the attribute determination means 4 of the signal processing section 111 of Embodiment 1. The operation from the line sensor 110 to characteristic calculation means 3 is the same as that already explained in Embodiment 1, and detailed description of the operation will not be repeated. In the image processing method of the present embodiment, first, the reference selection means 1 selects a reference block 2R and a notice picture element b2 (S1), as shown in FIG. 14. Then, orthogonal transform means 2 performs orthogonal transform of the value of each picture element within the reference block 2R to acquire orthogonal data (S2). Then, characteristic calculation means 3 calculates characteristic values representing characteristics of the reference block 2R for spatial frequency bands, that is, the low spatial frequency band, intermediate spatial frequency band and high spatial frequency band (S3).

Here, let it be supposed that for the reference block 2R containing the notice picture element g, a characteristic value of the low spatial frequency band is given by Fm(g), a characteristic value of the intermediate spatial frequency band is given by Fn(g), a characteristic value of the high spatial frequency band is given by Fp(g).

Then, integration means 5 integrates the characteristic value of reference block 2R containing the notice picture element g and the characteristic values of other blocks for every spatial frequency band (S4). Because of this, integration means 5 also needs the characteristic values of blocks with neighboring picture elements (g−1), (g+1) on both sides of notice picture element g in the main-scanning direction X as notice picture element, for example. In case characteristic values are obtained for reference block 2R containing notice picture element (g−1), reference block 2R containing notice picture element g and reference block 2R containing notice picture element (g+1) in that order, the characteristic values of reference block 2R containing the notice picture elements g, (g−1) are held in registers etc. until the characteristic values of reference block 2R containing the notice picture element (g+1) are obtained.

Let it be supposed that for the blocks containing the notice picture elements (g−1), (g+1) respectively, the characteristic values of the low spatial frequency band are given by Fm (g−1), Fm (g+1), the characteristic values of the intermediate spatial frequency band by Fn (g−1), Fn (g+1) and the characteristic values of the high spatial frequency band by Fp (g−1), Fp (g+1).

The integration means 5 integrates these characteristic values for every spatial frequency band. That is, the integration values of the characteristic values Fms (g), Fns (g), Fps (g) are given as follows:

$$Fms(g)=Fm(g-1)+Fm(g)+Fm(g+1)$$

$$Fns(g)=Fn(g-1)+Fn(g)+Fn(g+1)$$

$$Fps(g)=Fp(g-1)+Fp(g)+Fp(g+1)$$

In the present example, the characteristic values of reference block 2R containing notice picture element g and the characteristic values of the blocks with picture element on both sides of notice picture element g in the main-scanning direction X as notice picture element are integrated, but it is restrictive. For example, it is possible to integrate the characteristic values of blocks containing a specific number of picture elements ranging one by one in the main-scanning direction X like picture elements . . . , (g−2), (g−1) and picture elements (g+1), (g+2), . . . present around notice picture element g. And it is also possible to integrate the characteristic values of blocks containing a specific number of picture elements not ranging one by one in the main-scanning direction X like picture elements . . . , (g−4), (g−2) and picture elements (g+2), (g+4), . . . present around notice picture element g. Needless to say, the disposing direction of the respective notice picture elements is not limited to the main-scanning direction X. The main-scanning direction X is desirable because relatively much data are stored on line buffer 13 in that direction. But the disposing direction may be the sub-scanning direction Y, or the oblique direction between the main-scanning direction X and the sub-scanning direction Y.

Figure 15:
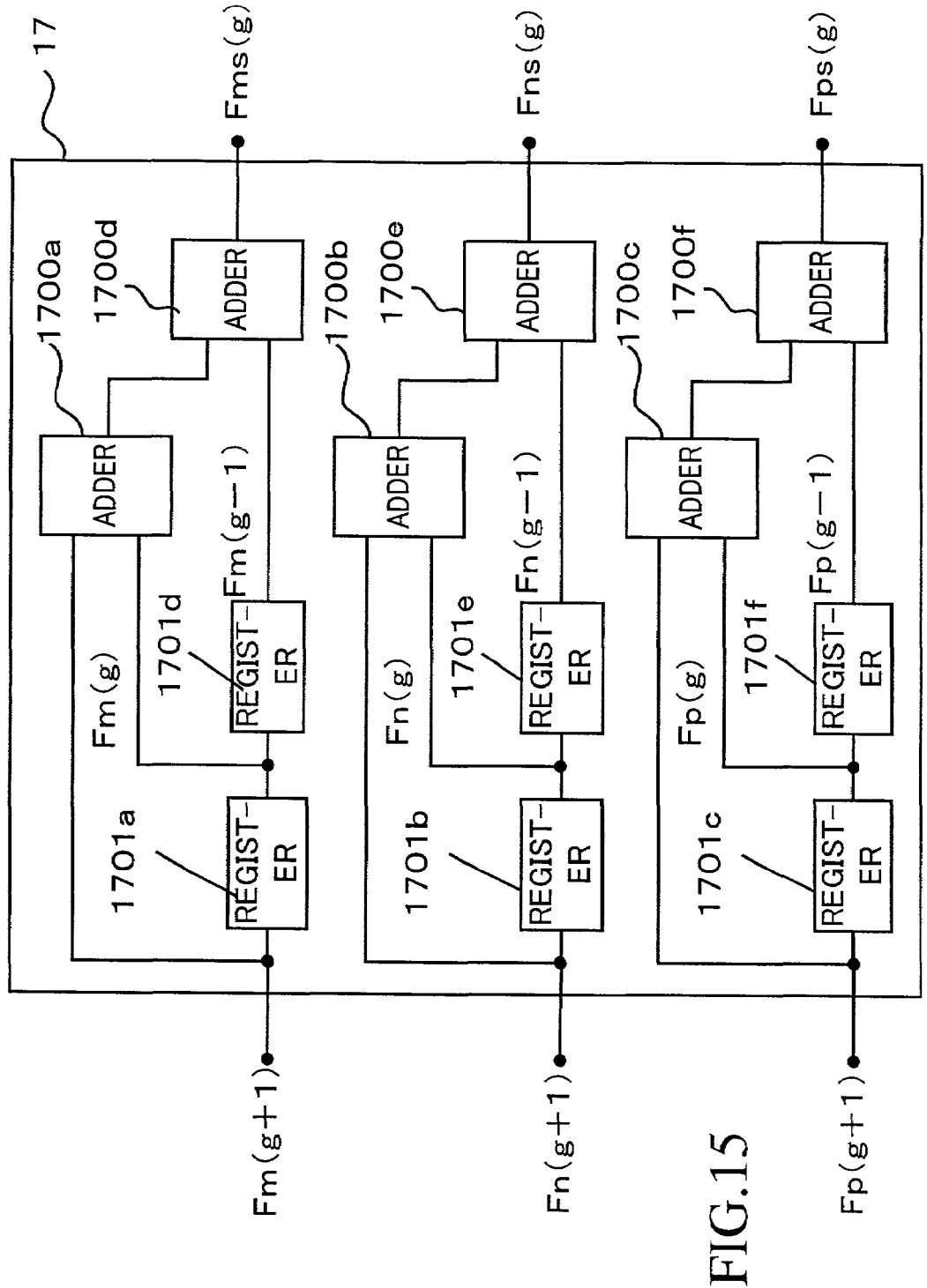
FIG. 15 is a diagram showing the configuration of an integration circuit in Embodiment 2.

Integration means 5 can be materialized by an integration circuit 17 as shown in FIG. 15, for example. The integration circuit 17 is provided with registers 1701a to 1701f and adders 1700a to 1700f. In the integration circuit 17, the integration components that respectively integrate characteristic values of the respective spatial frequency bands are the same. Therefore, there will be explained the integration component for the characteristic value Fm in the low spatial frequency band. Registers 1701a, 1701d in the integration circuit 17 are shift registers. To this register 1701d, characteristic value Fm (g−1) of reference block 2R containing the notice picture element (g−1) just before notice picture element g is always latched. To the register 1701a, characteristic value Fm (g) of reference block 2R containing notice picture element g is always latched. In this state, if characteristic value Fm (g+1) of reference block 2R containing the notice picture element (g+1) next to the notice picture element g is inputted, the adder 1700a adds the inputted characteristic value Fm (g+1) and characteristic value Fm(g) held in the register 1701a. The adder 1700d adds the addition result of the adder 1700a and characteristic value Fm (g−1) held in the register 1701d. Thus, Fm (g−1)+Fm (g)+Fm (g+1)=Fms (g) can be obtained at the output of the adder 1700a. Similarly, at the output of the adder 1700e, Fn (g−1)+Fn (g)+Fn (g+1)=Fns (g) can be obtained. Also, at the output of the adder 1700f, Fp (g−1)+Fp (g)+Fp (g+1)=Fps (g) can be obtained.

It is noted that in case integration is carried out by integration means 5, it can happen that no characteristic value of the reference block is present depending on the position of reference block whose characteristic values are integrated. For example, as in case no data of notice picture element is stored in the line buffer 13, it can happen that the notice picture element is situated outside the image. For this reference block, no characteristic values are calculated. In this case, with the respective characteristic values of this reference block as "0", integration means 5 may integrate only characteristic values of a reference block containing a notice picture element within the image.

Figure 16:
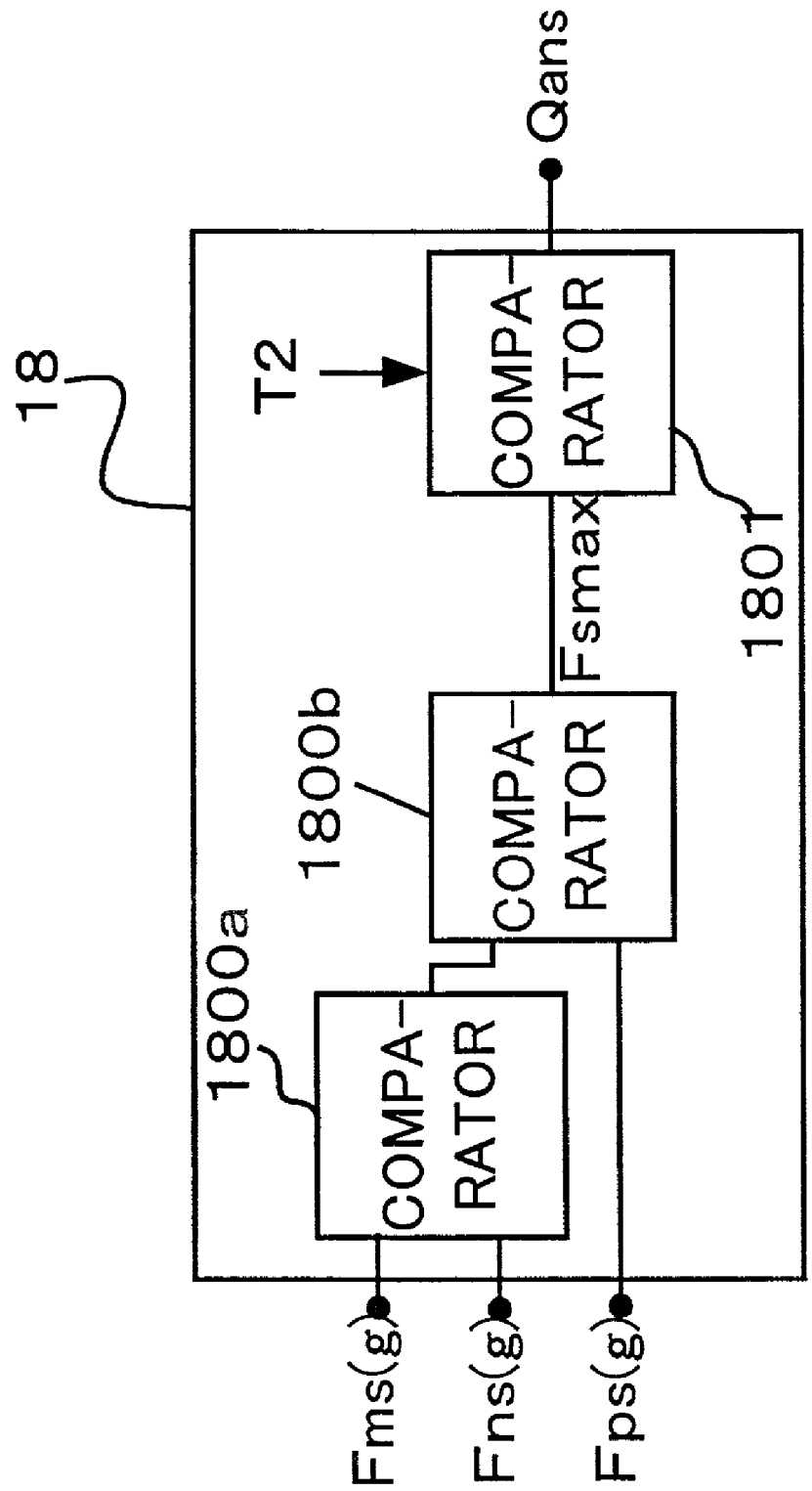
FIG. 16 is a diagram showing the configuration of a determination circuit in Embodiment 2

Next, attribute determination means 4 determines the attribute of notice picture element g on the basis of the integration results of integration means 5 (S5). In this case, attribute determination means 4 can be materialized by a determination circuit 18 as shown in FIG. 16, for example.

The determination circuit 18 is made up in the same way as the determination circuit 16 and has comparators 1800a, 1800b, 1801. The comparator 1800a compares integration result Fms (g) and integration result Fns (g) to see which is larger and outputs the larger value. The comparator 1800b compares the output of the comparator 1800a and integration result Fps (g) to see which is larger, and outputs the larger value. The comparator 1801 compares the output Fsmax of the comparator 1800b and threshold value T2 to see which is larger.

The threshold value T2 is set in advance according to the number of bits expressing image data of one picture element, the number of picture elements in the reference block and the number of characteristic values to be integrated. In case image data in one picture element are expressed in 8 bits and the number of picture elements in the reference block is 4×4=16, the threshold value is set at about "500"×3="1, 500".

In case Fsmax<T2, specific data indicating the continuous tone area is outputted as determination result Qans of notice picture element g. In case a 2-bit logical signal is used to express determination result Qans, determination result Qans is expressed in "00" to indicate the continuous tone area, for example. Unless Fsmax<T2, determination result Qans is outputted depending on which Fsmax is, Fms (g), Fns (g) or Fps (g). If Fsmax is characteristic value Fms (g), specific data to indicate that the attribute is the character area, "11", for example, is outputted as determination result Qans of notice picture element b2. In case Fsmax is characteristic value Fns (g) or Fps (g), specific data to indicate the screen halftone area, "10," for example, is outputted as determination result Qans of notice picture element g.

If, as described, the characteristic values of the other blocks with picture elements around the notice picture element of the reference block as notice picture element are integrated with the characteristic values of the reference block, and if attribute determination is performed on the basis of the integration results, more detailed attribute determination will be possible.

Embodiment 3

The signal processing section 111 in Embodiment 1 can carry out attribute determination in more detail than the prior art technique. But it can happen that screen halftone with a low resolution and character or line with high resolution resemble in characteristics. In such a case, it is feared that error of determination will occur.

FIG. 20(a) shows a concrete example of image data when the document is paper that is screen-printed with a low resolution. FIG. 20(b) shows a concrete example of orthogonal data in that case. As shown in FIG. 20(b), the absolute values of orthogonal data classified as intermediate spatial frequency band, the absolute values in the second row, third column, and the absolute values in the second row, fourth column, for example, are somewhat large as compared with absolute values of other orthogonal data, but no especially large values are shown.

On the other hand, FIG. 21(a) shows a concrete example in case the document is paper on which high-resolution characters and line are printed. FIG. 21(b) shows a concrete example of orthogonal data in that case. As shown in FIG. 21(b), the absolute values of orthogonal data classified as low spatial frequency band, for example, the absolute value in the first row, second column, is somewhat large. In addition, the absolute value of orthogonal data classified as intermediate spatial frequency band, for example, the absolute value in the first row, fourth column is somewhat large.

In other words, in case of characters and line with a high resolution, characteristics of characters and line and characteristics of screen halftone both appear, which can lead to error of determination.

If, for example, characteristic values are calculated in the same way as in Embodiment 1, the following results in the example of FIG. 20(b) are obtained: Fm=134, Fn=1358, Fp=130. In the example of FIG. 21(b), the results are Fm=914, Fn=954, Fp=10.

In any case, the characteristic value Fn in the intermediate spatial frequency band is the largest. In both cases, the results of attribute determination indicate that the attribute is a screen halftone area.

In this connection, in case of vertical straight line or horizontal straight line, it is generally observed that out of orthogonal data, the absolute value of specific orthogonal data tends to be large.

For example, in case of orthogonal data K1 to N4 shown in FIG. 4(b), when vertical straight line is present, the absolute values of orthogonal data L1, M1, N1 tend to be large. Also, when horizontal line is present, the absolute values of orthogonal data K2, K3, K4 tend to be large.

Figure 17:
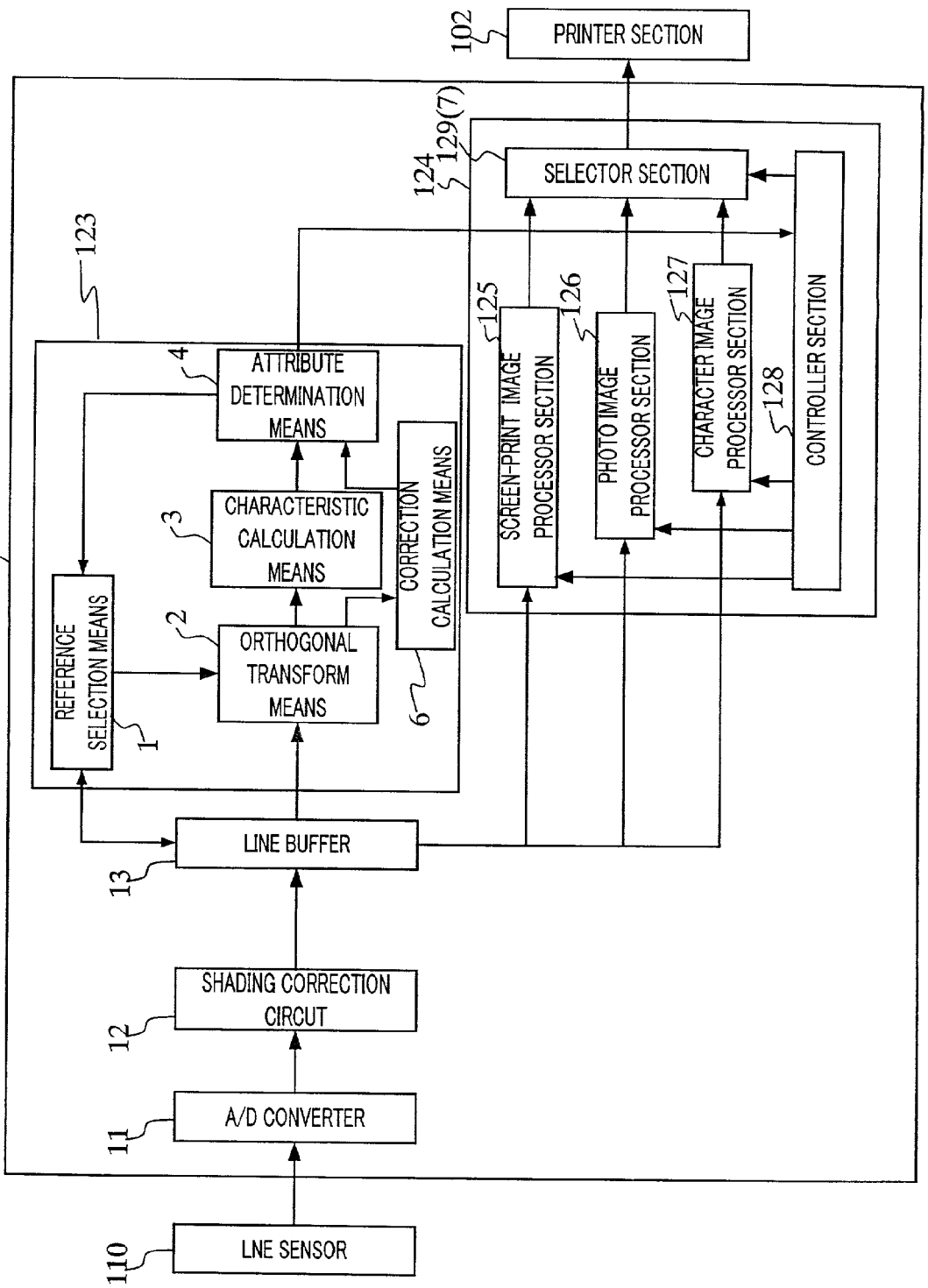
FIG. 17 is a diagram showing the outline arrangement of a signal processing section provided in a digital copying machine in Embodiment 3.

For this reason, the signal processing section Ill in Embodiment 3 is provided with correction calculation means 6 in addition to the arrangement of the signal processing section 111 of Embodiment 1 as shown in FIG. 17. The operation from A/D converter 11 to signal processing section 111 is the same as that already explained in Embodiment 1, and detailed description of the operation will not be made.

Correction calculation means 6 calculates correction values based on orthogonal data of a specific spatial frequency band out of the orthogonal data. For example, orthogonal data of a specific spatial frequency band are vertical line-related orthogonal data L1, M1, N1 and horizontal line-related orthogonal data K2, K3, K4. In this case, correction calculation means 6 can be materialized by a correction circuit 19 as shown in FIG. 18, for example.

Figure 18:
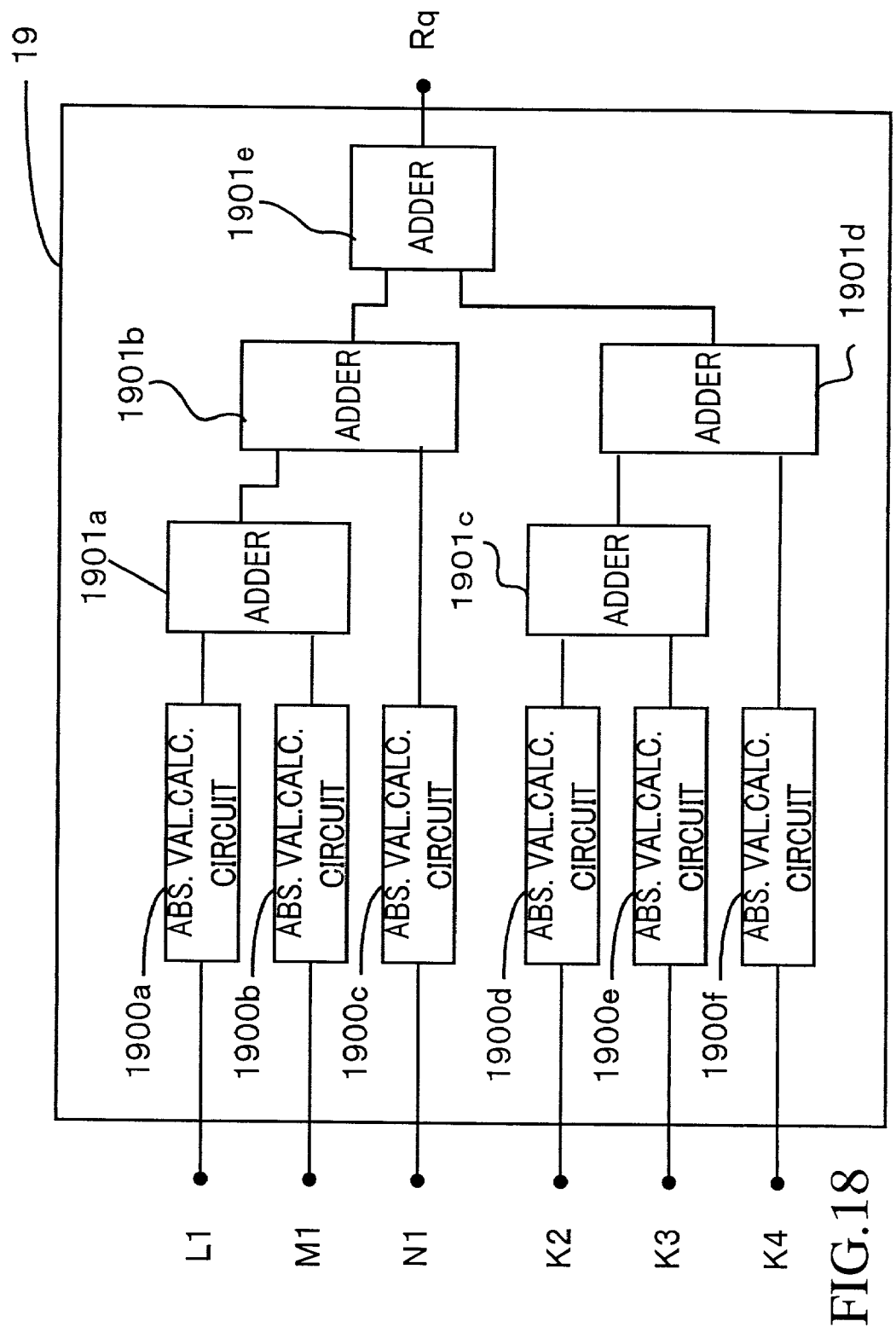
FIG. 18 is a diagram showing the configuration of a correction circuit in Embodiment 3.

The correction circuit 19 has absolute value calculation circuits 1900a to 1900f as shown in FIG. 18. Orthogonal data L1, M1, N1, K2, K3, K4 are inputted to the absolute value calculation circuits 1900a to 1900f. The absolute value operation circuits 1900a to 1900f calculate absolute values of the respective orthogonal data and output the results to adders 1901a, 1901c. For example, the respective absolute value calculation circuits 1900a, 1900b to which orthogonal data L1, M1 are inputted output absolute values |L1|, |M1| respectively to the adder 1901a.

The adder 1901a adds |L1| from the absolute value calculation circuit 1900a and the |M1| from the absolute value calculation circuit 1900b and outputs |L1+|M1| to the adder 1901b. |L1|+|M1| from the adder 1901a and |N1| from the absolute value calculation circuit 1900c are inputted to the adder 1901b. The adder 1501b adds up these and acquires |L1|+|M1|+|N1| and outputs it to the adder 1901e.

The adder 1901c adds |K2| from the absolute value calculation circuit 1900d and |K3| from the absolute value calculation circuit 1900e, and outputs |K2|+|K3| to the adder 1901d. |K2|+|K3| from the adder 1901c and |K4| from the absolute value calculation circuit 1900f are inputted to the adder 1901d. The adder 1901d adds up those and acquires |K2|+|K3|+|K4| and outputs it to the adder 1901e.

The adder 1901e adds |L1|+|M1+|N1| from the adder 1901b and |K2|+|K3|+|K4| from the adder 1901d and inputs |L1|+|M1|+|N1|+|K2|+|K3|+|K4| to the attribute determination means 4 as correction value Rq for vertical and horizontal straight lines.

Attribute determination means 4 determines the attribute of notice picture element b2 on the basis of characteristic values and correction value. Attribute determination means 4 in this case can be materialized by a determination circuit 20 as shown in FIG. 19, for example.

Figure 19:
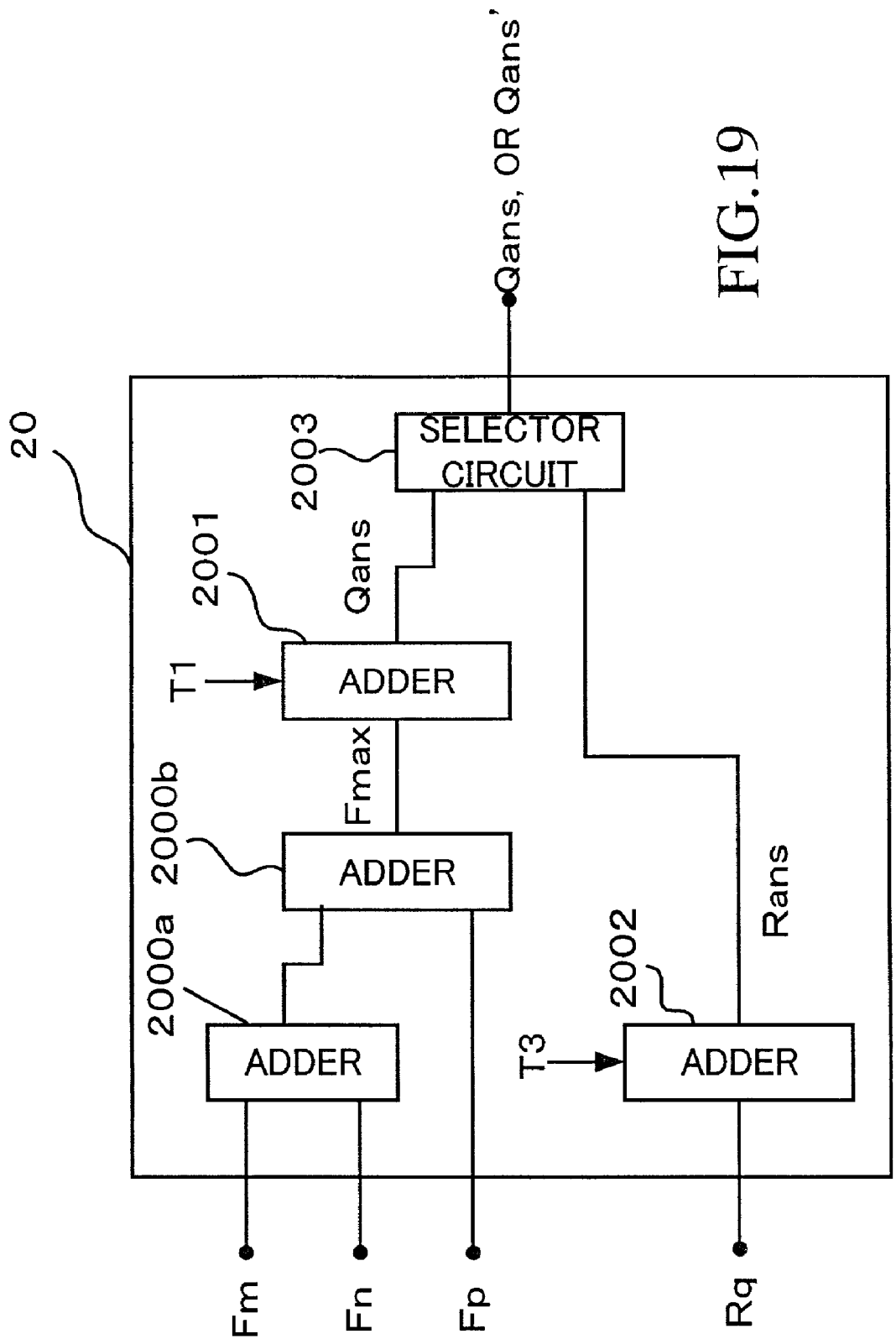
FIG. 19 is a diagram showing the configuration of a determination circuit in Embodiment 3.

As shown in FIG. 19, the determination circuit 20 like the determination circuit 16 has comparators 2000a, 2000b, 2001 and also a comparator 2002 and a selector circuit 2003. The comparator 2000a compares characteristic value Fm and characteristic value Fn to see which is larger and outputs the larger value. The comparator 2000b compares the output of the comparator 2000a and characteristic value Fp to see which is larger and outputs the larger value. The comparator 2001 compares the output Fmax of the comparator 2000b and threshold value T1 to see which is larger.

In case Fmax<T1, specific data indicating the continuous tone area is outputted to the selector circuit 2003 as determination result Qans of notice picture element b2. In case a 2-bit logical signal is used to express determination result Qans, determination result Qans is expressed in "00" to indicate the continuous tone area, for example. Unless Fmax<T1, determination result Qans is outputted depending on which Fmax is, Fm, Fn or Fp. If Fmax is characteristic value Fm, specific data to indicate the character area, "11", for example, is outputted to the selector circuit 2003 as determination result Qans of notice picture element b2. In case Fmax is characteristic value Fn or Fp, specific data to indicate the screen halftone area, "10," for example, is outputted to the selector circuit 2003 as determination result Qans of notice picture element b2.

In this determination circuit 20, furthermore, the comparator 2002 compares correction value Rq and threshold value T3 to see which is larger. Threshold value T3 is set in relation to threshold value T1. If threshold value T1 is some "500," the threshold value is set at about "500"×2="1000". And in case Rq<T3, specific data indicating a non-character area is outputted to the selector circuit 2003 by the comparator 2002 as correction result Rans. In case a 2-bit logical signal is used to express correction result Rans, correction result Rans is expressed in "10" to indicate the non-character area, for example. Unless Rq<T3, specific data indicating the character area, for example, "11" is outputted to the selector circuit 2003 as correction result Rans.

If determination result Qans is "10" indicating the screen halftone area, the selector circuit 2003 outputs determination result Qans or determination result Qans' corrected with correction result Rans, in accordance with correction result Rans. In case determination result Qans agrees with correction result Rans, determination result Qans is outputted. On the other hand, in case determination result Qans and correction result Rans are different from each other, that is, correction result Rans is "11" indicating the character area, correction result Rans is outputted as determination result Qans'. In case determination result Qans is not "10" indicating the screen halftone area, determination result Qans is outputted irrespective of correction result Rans.

Thus, provision of correction calculation means 6 reduces the possibility that part of a character expressed in vertical or horizontal line will be taken as screen halftone. With regard to the screen halftone area and character area, good attribute determination can be materialized.

Embodiment 4

Figure 22:
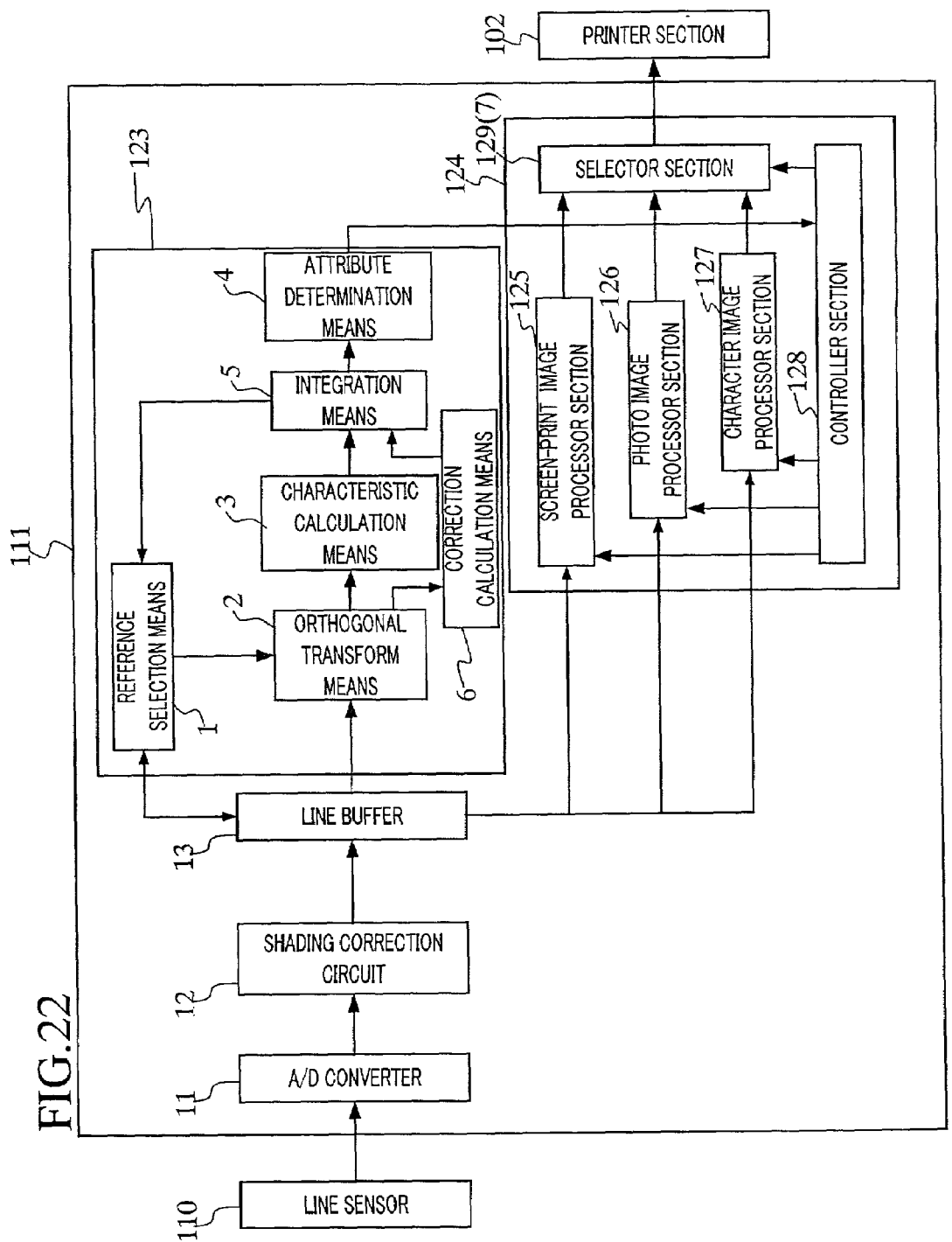
FIG. 22 is a block diagram showing the outline arrangement of a signal processing section provided in a digital copying machine in Embodiment 4.

As shown in FIG. 22, the signal processing section 111 in Embodiment 4 has correction calculation means 6 in addition to the arrangements in the signal processing section 111 in Embodiment 2. The operation in signal processing section 111 from the A/D converter 11 to characteristic calculation means 3 and up to correction calculation means 6 is identical with those in Embodiments 1 and 3 and will not be explained again here.

Here, let it be supposed that for reference block 2R containing notice picture element h, the characteristic value of the low spatial frequency band is given by Fm (h), the characteristic value of the intermediate spatial frequency band by Fn (h) and the characteristic value of the high spatial frequency band by Fp (h). Also, let it be supposed that for reference block 2R with neighboring picture elements (h−1), (h+1) on both sides of notice picture element h in the main-scanning direction X as notice picture element, the characteristic values of the low spatial frequency band are given by Fm (h−1), Fm (h+1), the characteristic values of the intermediate spatial frequency band by Fn (h−1), Fn (h+1), the characteristic values of the high spatial frequency band by Fp (h−1), Fp (h+1).

Furthermore, let it be supposed that for notice picture element h, notice picture element (h−1) and notice picture element (h+1), correction values are given by Rq (h), Rq (h−1), Rq (h+1).

The integration means 5 integrates those characteristic values for every spatial frequency band. That is, the integrated values Fms (h), Fns (h), Fps (h) of the characteristic values are given by the following equations:

$$Fms(h)=Fm(h-1)+Fm(h)+Fm(h+1)$$

$$Fns(h)=Fn(h-1)+Fn(h)+Fn(h+1)$$

$$Fps(h)=Fp(h-1)+Fp(h)+Fp(h+1)$$

Also, integration means 5 integrates each correction value. That is, the integration result Rqs (h) is given by the following equation.

$$Rqs(h)=Rq(h-1)+Rq(h)+Rq(h+1)$$

In this example, characteristic values and correction values of blocks whose notice picture elements (h−1), (h+1) are on both sides of notice picture element h in the main-scanning direction X are integrated with characteristic values and correction values of reference block 2R, but it is not restrictive. For example, it is possible to integrate the characteristic values and correction values of blocks containing a specific number of picture elements ranging one by one in the main-scanning direction X like picture elements . . . , (h−2), (h−1) and picture elements (h+1), (h+2), . . . present around notice picture element h. And, it is also possible to integrate the characteristic values and correction values of blocks containing a specific number of picture elements not ranging one by one in the main-scanning direction X like picture elements . . . , (h−4), (h−2) and picture elements (h+2), (h+4), . . . present around notice picture element h. Needless to say, the disposing direction of the respective notice picture elements is not limited to the main-scanning direction X. The main-scanning direction X is desirable, because relatively much data are stored on line buffer 13 in the direction. But the disposing direction may be the sub-scanning direction Y, or the oblique direction between the main-scanning direction X and the sub-scanning direction Y.

Figure 23:
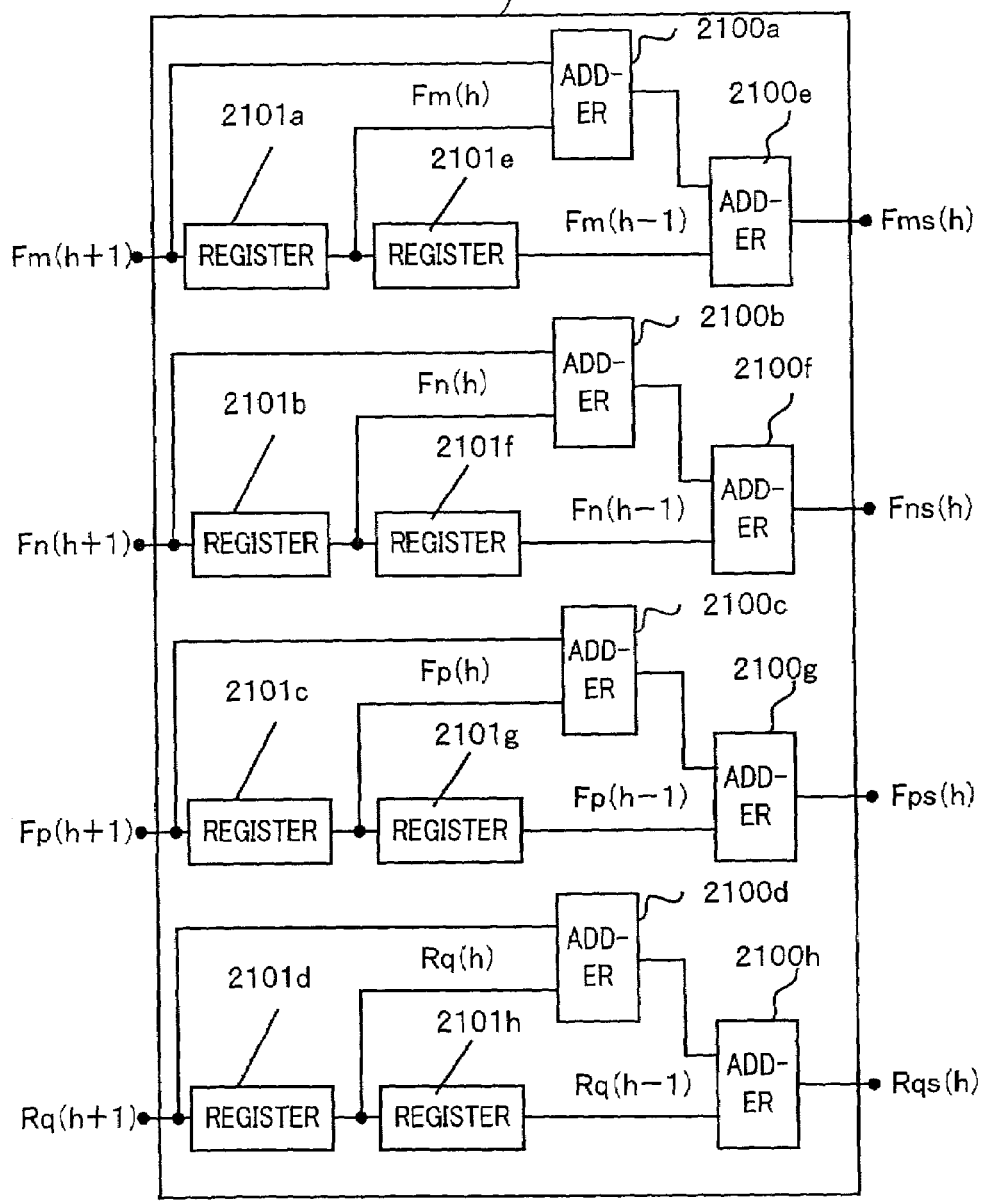
FIG. 23 is a diagram showing the configuration of an integration circuit in Embodiment 4.

In this case, the integration means 5 can be materialized by the integration circuit 21 as shown in FIG. 23, for example. The integration circuit 21 is provided with registers 2101a to 2101h and adders 2100a to 2100h. In the integration circuit 21, the integration components that integrate the characteristic values of the respective spatial frequency bands and the correction values are the same. Therefore, there will be explained the integration component for characteristic value Fm in the low spatial frequency band. Registers 2101a, 2101e in the integration circuit 21 are shift registers. To this register 2101e, characteristic value Fm (h−1) of reference block 2R containing the notice picture element (h−1) just before notice picture element h is always latched. To the register 2101a, characteristic value Fm (h) of reference block 2R containing notice picture element h is always latched. In this state, if characteristic value Fm (h+1) of reference block 2R containing notice picture element (h+1) next to notice picture element h is inputted, the adder 2100a adds the inputted characteristic value Fm (h+1) and characteristic value Fm (h) held in the register 2101a. The adder 2100e adds the addition result of the adder 2100a and characteristic value Fm (h−1) held in the register 2101e. Thus, Fm (h−1)+Fm (h)+Fm (h+1)=Fms (h) can be obtained at the output of the adder 2100e. Similarly, at the output of the adder 2100f, Fn (h−1)+Fn (h)+Fn (h+1)=Fns (h) can be obtained. Also, at the output of the adder 2100g, Fp (h−1)+Fp (h)+Fp (h+1)=Fps (h) can be obtained. Furthermore, at the output of the adder 2100h, Rq (h−1)+Rq(h)+Rq (h+1)=Rqs is obtained.

It is noted that in case integration is performed by integration means 5, it can happen that no characteristic value of the reference block is present depending on the position of reference block whose characteristic values and correction values are integrated. For example, as in case no data of notice picture element is stored in the line buffer 13, it can happen that the notice picture element is situated outside the image. For this reference block, no characteristic values are calculated. In this case, with the respective characteristic values and correction values of this reference block as "0", integration means 5 integrates only characteristic values and correction values of reference blocks containing a notice picture element within the image.

Figure 24:
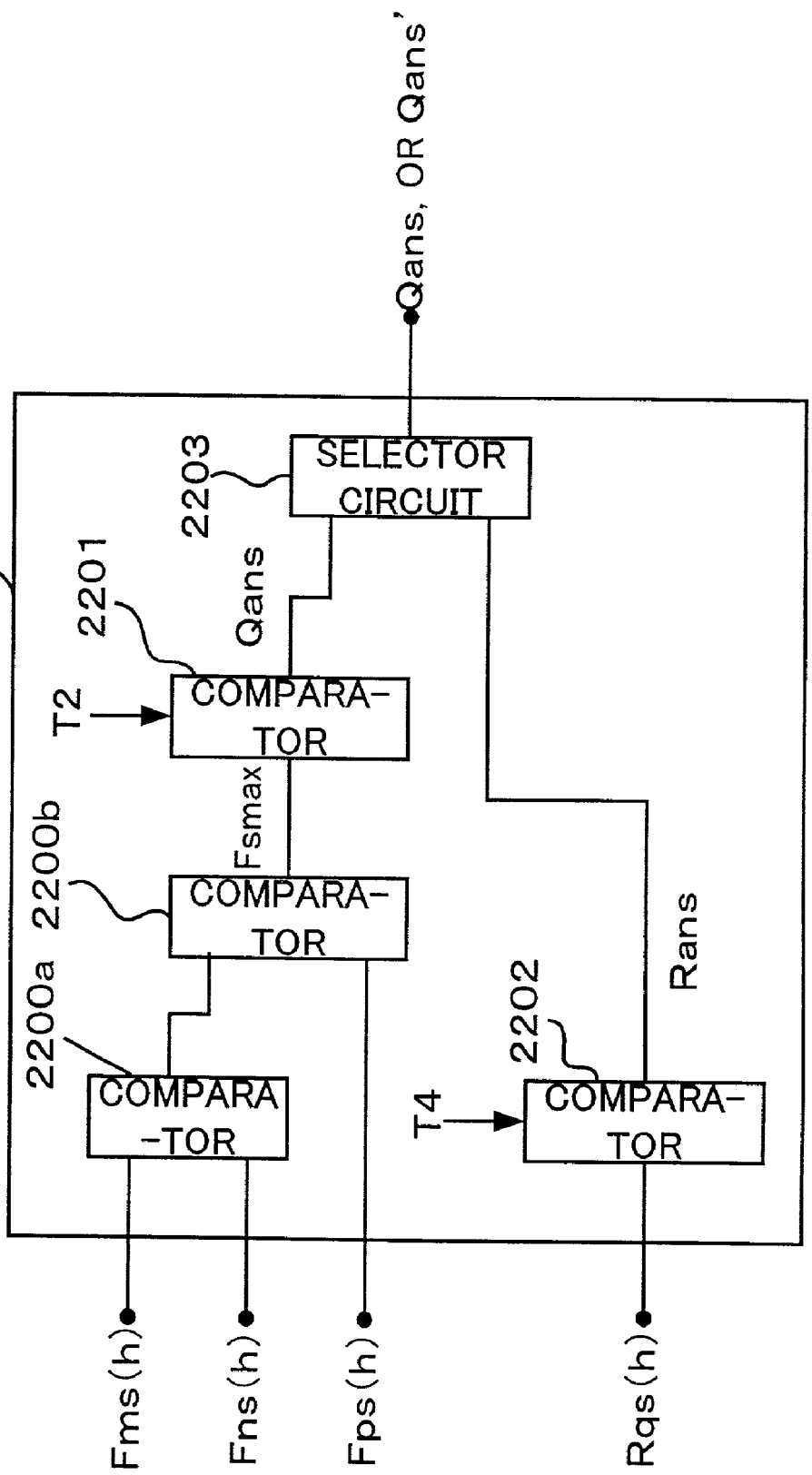
FIG. 24 is a diagram showing the configuration of a determination circuit in Embodiment 4.

The attribute determination means 4 determines the attribute of the notice picture element h on the basis of the integration results of the integration means 5. In this case, attribute determination means 4 can be materialized by the determination circuit 22 as shown in FIG. 24.

The determination circuit 22 is made up in the same way as the determination circuit 18 and is equipped with comparators 2200a, 2200b, 2201, 2202, selector circuit 2203. The comparator 2200a compares characteristic value Fms (h) and characteristic value Fns (h) to see which is larger and outputs the larger value. The comparator 2200b compares the output of the comparator 2200a and the characteristic value Fps (h) to see which is larger and outputs the larger value. The comparator 2201 compares the output Fsmax of the comparator 2200b and threshold value T2 to see which is larger.

In case Fsmax<T2, specific data indicating the continuous tone area is outputted to the selector circuit 2203 as determination result Qans of notice picture element h. In case a 2-bit logical signal is used to express determination result Qans, determination result Qans is expressed in "00" to indicate the continuous tone area, for example. Unless Fmax <T2, determination result Qans is outputted depending on which Fsmax is, Fms (h), Fns (h) or Fps (h). If Fsmax is characteristic value Fms (h), specific data to indicate the character area, "11", for example, is outputted to the selector circuit 2203 as determination result Qans of notice picture element h. In case Fsmax is characteristic value Fns (h) or Fps (h), specific data to indicate that the attribute is the screen halftone area, "10," for example, is outputted to the selector circuit 2203 as determination result Qans of notice picture element h.

Furthermore, the comparator 2202 compares correction result Rqs (h) and threshold value T4 to which is larger. Threshold value T4 is set in relation to threshold value T2. If threshold value T2 is some "500"×3="1500", the threshold value is set at about "1500"×2="3000". And in case Rqs (h)<T4, the comparator 2202 outputs to the selector circuit 2203 specific data as correction result Rans indicating the non-character area. In case a 2-bit logical signal is used to express determination result Qans, determination result Qans is expressed in "10" to indicate the non-character area, for example. Unless Rqs (h)<T3, specific data to indicate the character area, for example, "11" is outputted to the selector circuit 2003 as correction result Rans.

In case determination result Qans is "10" representing the screen halftone area, the selector circuit 2203 outputs determination result Qans or determination result Qans' corrected with correction result Rans, in accordance with correction result Rans. In case determination result Qans agrees with correction result Rans, determination result Qans is outputted. On the other hand, in case determination result Qans are different from correction result Rans, that is, correction result Rans is "11" indicating the character area, correction result Rans is outputted as determination result Qans'. In case determination result Qans is not "10" representing the screen halftone area, determination result Qans is outputted irrespective of correction result Rans.

This way, attribute determination can be performed on notice picture element h of reference block 2R in more detail than in Embodiments 1, 2, 3.

(Other)

In Embodiments 1 to 4, the present invention is applied to the digital copying machine but it is not limited to that. For example, the present invention can be applied to other image processing apparatuses such as a scanner and facsimile.

FIG. 25 shows the outline arrangement of the signal processing section 111 when the present invention is applied to the scanner.

As shown in FIG. 25, the arrangement of the attribute If determination section 123 is the same as the attribute determination section 123 in Embodiment 2. Also, the upstream portion of the line sensor 110 (not shown in FIG. 25) can be made up in the same way as in the image scanner section 101 of the digital copying machine. In case the present invention is applied to the digital copying machine, the determination result of the attribute determination section 123 is utilized for improvement of the picture quality. Meanwhile, when the present invention is applied to the scanner, the determination result may be used for selection of a compression mode.

Compression section 130 selects a compression mode according to the determination results from the attribute determination section 123, compresses image data scanned by an image scanner section and stores the data in a data storage 136.

The compression section 130 is provided with a high compression section 131, an intermediate compression section 132 and a low compression section 133.

Controlled by controller section 134, high compression section 131, intermediate compression section 132 and low compression section 133 read image data stored in the line buffer 13 respectively. High compression section 131 compresses the read image data b00 in a compression mode of the highest compression ratio. Intermediate compression section 132 compresses the data in a compression mode of intermediate compression ratio. Low processing compression section 133 compresses the data in a compression mode of the lowest compression ratio.

Here, the compression mode includes at least either compression method or compression ratio. In case different compression methods are used in high compression section 131, intermediate compression section 132, low compression section 133, for example, of these compression methods, high compression section 131 utilizes a compression method of the highest compression ratio. In case the same compression method with the compression ratio variable are used in high compression section 131, intermediate compression section 132 and low compression section 133, high compression section 131 compresses the data by the method at the highest compression ratio.

The respective outputs of high compression section 131, intermediate compression section 132 and low compression section 133 are inputted in the selector section 135. The selector section 135 is also a concrete example of image processing selection means 7. Controller section 134 makes selector section 135 select one of the inputs according to the determination results from the attribute determination section 123.

For example, if the determination result is "00", the selector section 135 stores the input from the low compression section 133 in the data storage 136. In this case, importance is attached to keeping compression from deteriorating the picture quality. If the determination result is "11," the selector section 135 stores the input from the high compression section 131 in the data storage 136. In case the object is character, it is legible even if the picture quality somewhat deteriorates. In this case, therefore, it is important to reduce the consumption of the storage capacity. If the determination result is "10," the selector section 135 stores the input from the intermediate compression section 132 in the data storage 136. In this case, importance is attached equally to both keeping the picture quality from deteriorating and reduction of the consumption.

As set forth above, the picture quality according to the attribute and compression ratio can be selected with precision.

The present invention is applicable to not only image processing apparatuses to scan images of the document such as digital copying machine and scanner but also other image processing apparatuses such as digital still camera.

Furthermore, attribute determination is performed on notice picture element in Embodiments 1 to 4, but the present invention is not limited to that. Attribute determination may be directed to a notice area made up of a plurality of picture elements within a reference block instead of the notice picture element. In this case, the amount of attribute determination can be reduced, though the quality may somewhat deteriorate as compared with the attribute determination of notice picture element.

Also, in Embodiments 1 to 4, the signal processing section 111 is formed of exclusive circuits, but the present invention is not limited to that. For example, it is possible to have the microprocessor carry out the procedure shown in FIG. 14 according to control of a program. In this case, the program is stored beforehand in a nonvolatile memory the microprocessor can read out, and when an image is inputted, the microprocessor reads out the program. The program materializes an attribute determination function and image processing function in cooperation with the microprocessor and the line buffer as already described.

Such a program can be distributed in such a way that the program is stored in non-volatile memory built in the device, in such a way that the program is recorded on computer readable recording medium such as Compact Disk Read Only Memory (CDROM) or through electric communication circuits such as the Internet.

Furthermore, the present invention can be applied to image processing apparatuses for color images and also image processing apparatuses exclusive for black-and-white images.

In the present invention, as set forth above, such attributes as screen halftone area, character area and continuous tone area are determined for every notice area on the basis of characteristic values of the reference block, and therefore the precision of attribute determination can be improved. As a result, when an image is recorded on paper, a suitable mode of image processing can be selected. Also, when an image is compressed, a suitable mode can be selected. Needless to say, no processing such as inverse transform as in the prior art is needed, and the processing time is short.

Furthermore, if the characteristic value of the reference block and characteristic values of other blocks are integrated for every spatial frequency, the precision of attribute determination can be improved that much. Since the characteristic values of other blocks are integrated and attribute determination is performed on the notice area alone, the adverse effect of error of determination can be reduced.

In addition, even if the screen halftone area and the character area resemble in characteristics, error of determination can be reduced by utilizing for attribute determination a correction value based on orthogonal data in a specific spatial frequency band out of the orthogonal data.

The invention claimed is:

1. An image processing apparatus which comprises:
reference selection means for selecting a reference block containing a plurality of picture elements of an image and selecting a notice area made up of one or a plurality of picture elements within said reference block;
orthogonal transform means for obtaining orthogonal data which are results of orthogonal transforming values of picture elements within said reference block;
characteristic calculation means for calculating characteristic values representing characteristics of said reference block for every spatial frequency band on the basis of said orthogonal data; and
attribute determination means for determining an attribute of said notice area on the basis of said characteristic values.

2. An image processing apparatus which comprises:
reference selection means for selecting a reference block containing a plurality of picture elements of an image and selecting a notice area made up of one or a plurality of picture elements within said reference block;
orthogonal transform means for obtaining orthogonal data which are results of orthogonal transforming values of picture elements within said reference block;
characteristic calculation means for calculating characteristic values representing characteristics of said reference block for every spatial frequency band on the basis of said orthogonal data;
integration means for integrating said characteristic values of said reference block and characteristic values of other blocks for every spatial frequency band; and
attribute determination means for determining an attribute of said notice area on the basis of integration results by said integration means.

3. An image processing apparatus which comprises:
reference selection means for selecting a reference block containing a plurality of picture elements of an image and selecting a notice area made up of one or a plurality of picture elements within said reference block;
orthogonal transform means for obtaining orthogonal data which are results of orthogonal transform of values of picture elements within said reference block;
characteristic calculation means for calculating characteristic values representing characteristics for every spatial frequency band of said block on the basis of said orthogonal data;

correction calculation means for calculating correction values based on the orthogonal data of a specific spatial frequency band out of said orthogonal data; and attribute determination means for determining an attribute of said notice area on the basis of said characteristic values and said correction values.

4. The image processing apparatus of any one of claims 1 to 3 wherein said attribute is any one of a screen halftone area, character area and continuous tone area.

5. The image processing apparatus of any one of claims 1 to 3 wherein said characteristic calculation means calculates said characteristic values on the basis of said orthogonal data other than the orthogonal data with the lowest spatial frequency band.

6. The image processing apparatus of any one of claims 1 to 3 wherein said image is an image scanned from a document.

7. The image processing apparatus of claim 6 wherein said reference selection means selects said reference blocks one after another with moving a position of selecting said reference block by one picture element in a main-scanning direction of the document, and continuing the moving of the position in the main-scanning direction after moving the position in a sub-scanning direction of the document if the last position is an end in the main-scanning direction.

8. The image processing apparatus of any one of claims 1 to 3 wherein in case the picture elements of said image are contained only in a part of the said reference block, said orthogonal transform means stuffs values of picture elements of said reference block other than the part with values representing a white image.

9. The image processing apparatus of any one of claims 1 to 3 which is provided with image processing selection means for selecting a mode of image processing for said notice area on the basis of an attribute determination by said attribute determination means.

10. The image processing apparatus of claim 9 wherein said image processing is compression.

11. The image processing apparatus of claim 2 wherein in case the notice area of said other block is outside said image, said integration means integrates the characteristic value of said reference block and the characteristic value of said other block with the notice area found within said image.

12. The image processing apparatus of claim 3 which further comprises integration means for integrating the characteristic value of said reference block and the characteristic value of other block and integrating the correction value of said reference block and the correction value of said other block, and wherein said attribute determination means determines the attribute of said notice area on the basis of integration results by said integration means.

13. The image processing apparatus of claim 2 or claim 12 wherein said other block has a notice area around the notice area of said reference block.

14. An image processing method which comprises the steps of:

selecting a reference block containing a plurality of picture elements of an image and selecting a notice area made up of one or a plurality of picture elements within said reference block;

obtaining orthogonal data which are results of orthogonal transforming values of picture elements within said reference block;

calculating characteristic values representing characteristics of said reference block for every spatial frequency band on the basis of said orthogonal data;

integrating said characteristic values of said reference block and characteristic values of other block for every spatial frequency band; and determining an attribute of said notice area on the basis of integration results.

15. An image processing program recorded on a computer readable recording medium to have a computer to carry out the steps of:

selecting a reference block containing a plurality of picture elements making up an image and selecting a notice area made up of one or a plurality of picture elements within said reference block;

obtaining orthogonal data which are results of orthogonal transforming of values of picture elements within said reference block;

calculating characteristic values representing characteristics of said reference block for every spatial frequency band on the basis of said orthogonal data;

integrating characteristic values of said reference block and characteristic values of other block for every spatial frequency band; and determining an attribute of said notice area on the basis of integration results.

* * * * *